United States Patent [19]

Dudash et al.

[11] Patent Number: 4,910,658

[45] Date of Patent: Mar. 20, 1990

[54] REAL TIME PROCESS CONTROLLER WITH SERIAL I/O BUS

[75] Inventors: George M. Dudash, Escondido; Joseph J. Kirby, Carlsbad, both of Calif.

[73] Assignee: Eaton Leonard Technologies, Inc., Carlsbad, Calif.

[21] Appl. No.: 251,008

[22] Filed: Sep. 27, 1988

Related U.S. Application Data

[63] Continuation of Ser. No. 772,468, Sep. 4, 1985, abandoned.

[51] Int. Cl.⁴ .................. G08C 19/00; G08C 15/46
[52] U.S. Cl. ......................... 364/138; 364/131; 364/188; 340/825.07; 340/825.51
[58] Field of Search .................. 364/131–133, 364/138, 139, 188, 189, 200, 900; 340/825.05, 825.07, 825.16, 825.17, 825.36, 825.5, 825.51, 712, 722

[56] References Cited

U.S. PATENT DOCUMENTS

| | | |
|---|---|---|
| 3,158,317 | 11/1964 | Alexander . |
| 3,299,681 | 1/1967 | Hautau . |
| 3,459,018 | 8/1969 | Miller ................................. 72/14 |
| 3,618,349 | 11/1971 | Roch .................................. 72/7 |
| 3,673,327 | 6/1972 | Johnson et al. .................... 340/712 |
| 3,699,531 | 10/1972 | Heimann ............................ 364/200 |
| 3,757,322 | 9/1973 | Barkan et al. ..................... 340/712 |
| 3,803,974 | 4/1974 | Everest et al. ..................... 340/163 |
| 3,862,119 | 7/1974 | Marotto ............................. 72/36 |
| 3,878,512 | 4/1975 | Kobayashi et al. ............... 340/825.07 |
| 4,001,807 | 1/1977 | Dallimonti ......................... 364/188 |
| 4,092,570 | 5/1978 | Nakamoto ......................... 364/138 |
| 4,109,145 | 8/1978 | Graf .................................. 250/201 |
| 4,124,887 | 11/1978 | Johnson et al. .................... 364/138 |
| 4,131,003 | 12/1978 | Foster et al. ....................... 72/7 |
| 4,198,623 | 4/1980 | Misek et al. ....................... 340/712 |
| 4,234,952 | 11/1980 | Gable et al. ....................... 340/825.5 |
| 4,251,858 | 2/1981 | Cambigue et al. ................ 340/825.17 |
| 4,303,973 | 12/1981 | Williamson, Jr. et al. ......... 364/189 |
| 4,319,338 | 3/1982 | Grudowski et al. ............... 364/900 |
| 4,320,467 | 3/1982 | Glass ................................. 340/825.5 |
| 4,396,977 | 9/1983 | Slater et al. ....................... 364/188 |
| 4,424,559 | 1/1984 | Lorincz et al. .................... 364/138 |
| 4,530,045 | 7/1985 | Petroff .............................. 364/132 |
| 4,560,985 | 12/1985 | Strecker et al. ................... 340/825.5 |
| 4,570,217 | 2/1986 | Allen et al. ........................ 364/188 |
| 4,570,257 | 2/1986 | Olson et al. ....................... 340/825.51 |
| 4,583,170 | 4/1986 | Carlin et al. ...................... 340/825.36 |
| 4,622,550 | 11/1986 | O'Connor et al. ................ 340/825.5 |
| 4,628,437 | 12/1986 | Poschmann et al. .............. 364/131 |
| 4,635,030 | 1/1987 | Rauch ............................... 340/825.5 |
| 4,652,873 | 3/1987 | Dolser et al. ...................... 340/825.5 |
| 4,689,736 | 8/1987 | Glaudel et al. .................... 364/132 |

Primary Examiner—John R. Lastova
Attorney, Agent, or Firm—Knobbe, Martens, Olson & Bear

[57] ABSTRACT

A process control system for monitoring and controlling elements of a process. A control unit is electrically connected to a multi-conductor cable upon which are removably connected in series configuration a plurality of serially addressable control modules. The control modules are removably connected to elements of the controlled process to permit monitoring and control of the elements. The modules may be readily connected to or removed from the process elements and multi-conductor cable, to permit expansion or modification of the control system as needed for proper use in controlling process systems. The control modules operate independently from outside signals in monitoring the process elements, and respond to selected element status conditions by accessing communication with the central controller on a priority basis over other control modules in the system. The control unit includes a touch sensitive video screen for providing information to an receiving instructions from a user. The information and its configuration presented on the screen may be easily modified by user interaction with the screen, to quickly accommodate control system changes.

34 Claims, 13 Drawing Sheets

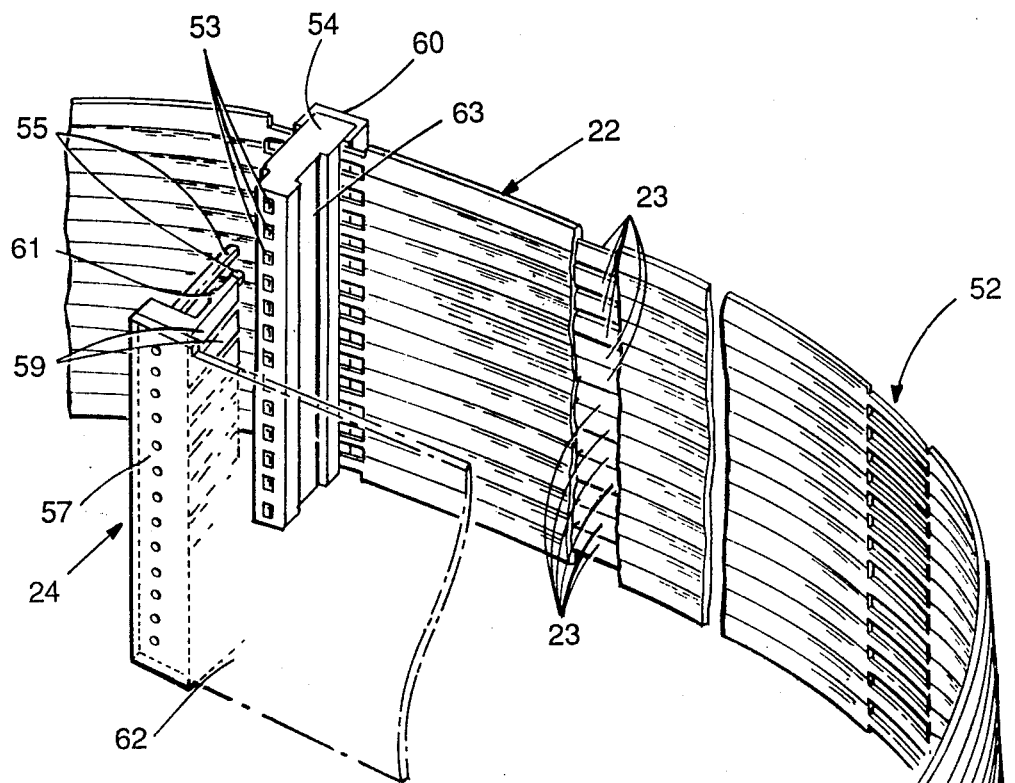
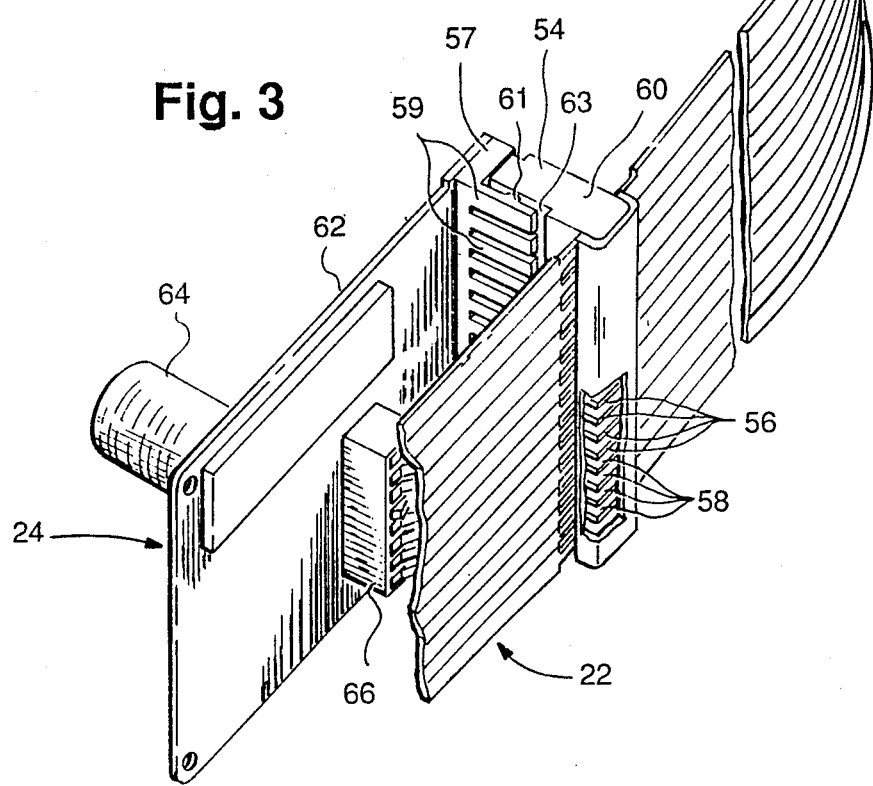
Fig. 3

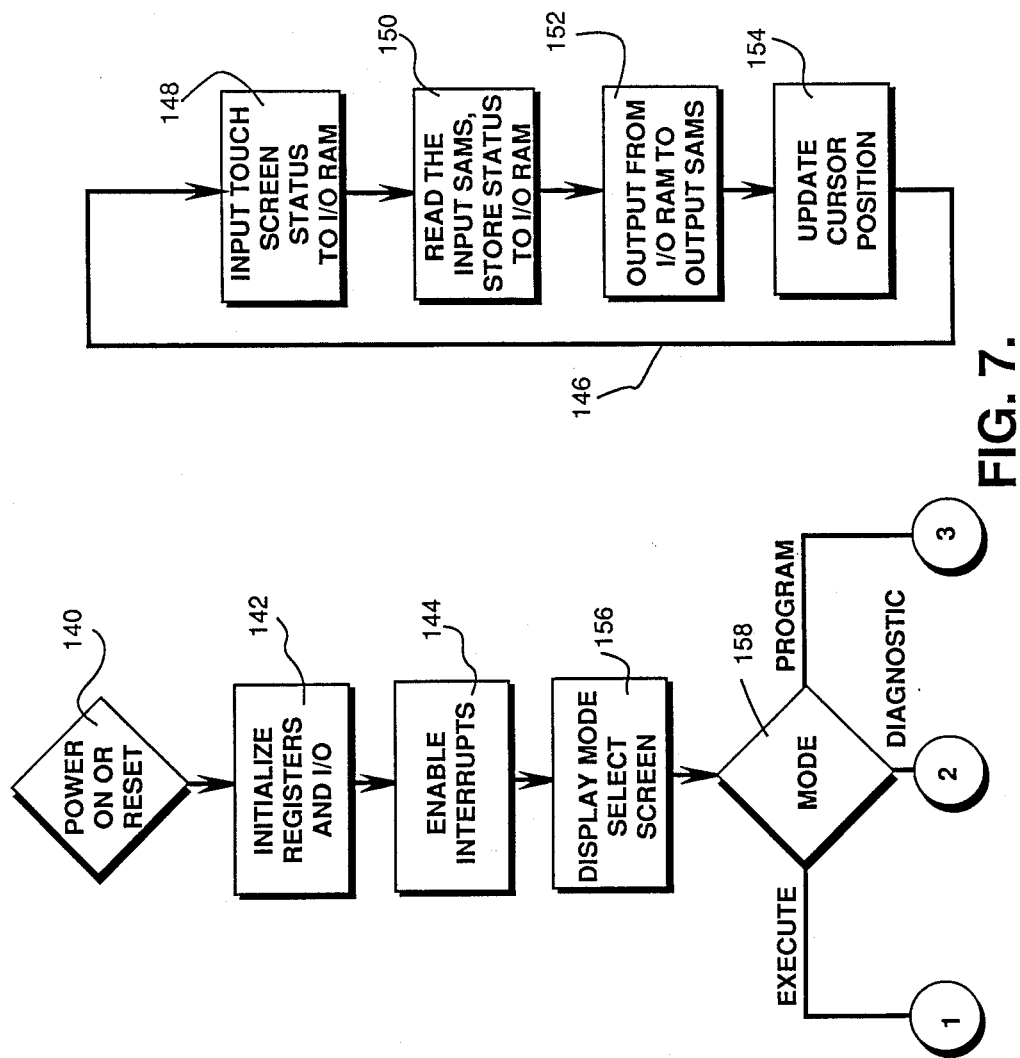

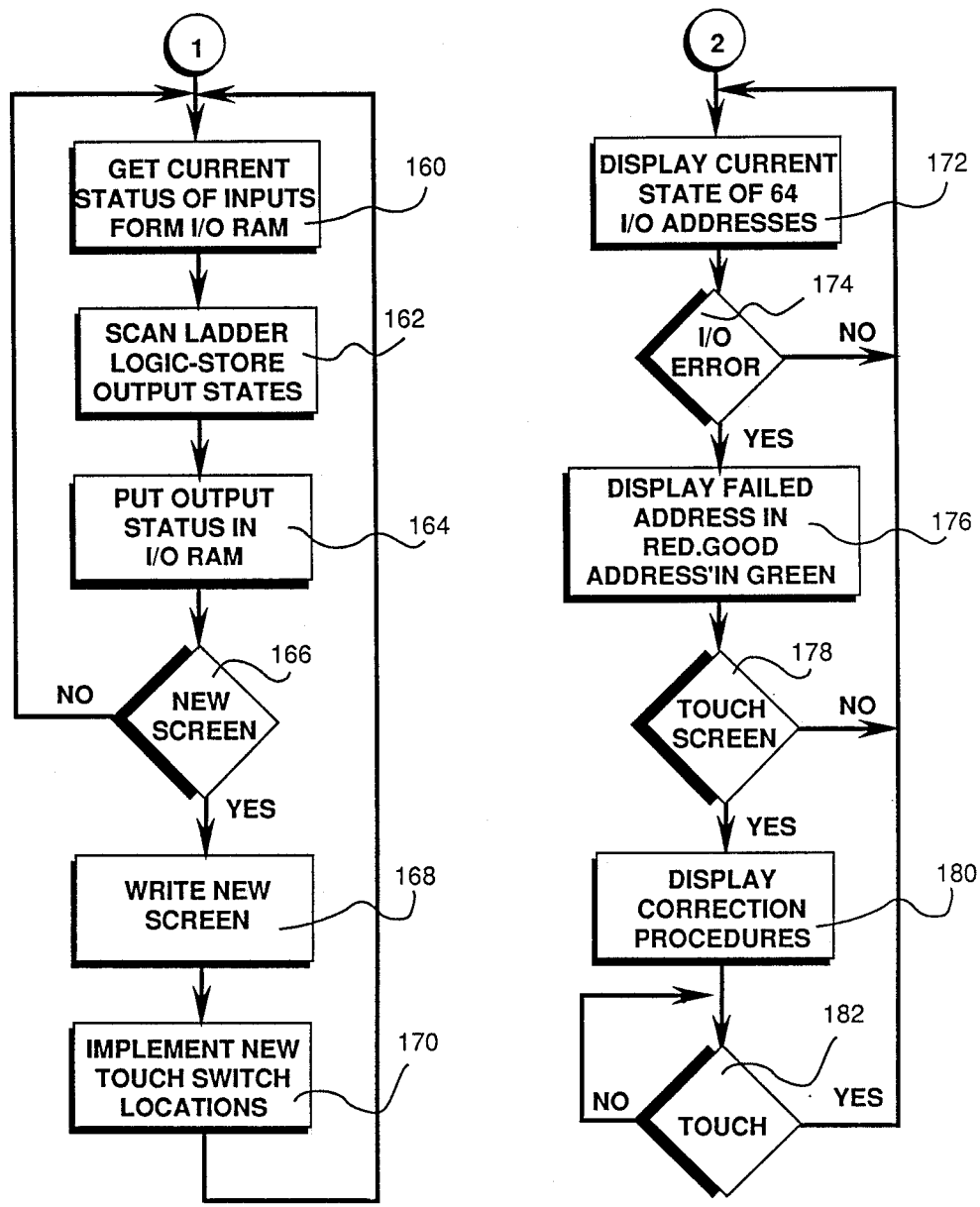

REAL TIME PROCESS CONTROLLER WITH SERIAL I/O BUS

This application is a continuation of application Ser. No. 772,468, filed Sept. 4, 1985, now abandoned.

BACKGROUND OF THE INVENTION

1. Field of the Invention

The present invention relates to automated process control systems, and in particular, to a user interactive process control system which is rapidly expandable and adaptable for use in many different types of processes.

2. The Prior Art

Over the years, process controls systems have evolved from relatively simple individual controllers for specific process conditions to very large integrated systems including digital processing equipment. In order to obtain process information from these systems quickly, for use by the operators, large control panels were often required often, complex control systems may have control panels which are several feet in length, with the process information and operator control devices located at various places along the panel.

Arrangements in which the information and control devices are spread out in such a manner have serious drawbacks. As a result, efforts have been made to more effectively consolidate the information and controls However, the costs for obtaining reliability and speed, as well as the operating and maintenance expenses have continued to be a concern in such complex systems. This results from the fact that conventional process controllers typically require hundreds of input/output wires. Further, to obtain machine-controller integration of a process and control system typically requires a design and installation process taking weeks of skilled labor to complete.

The numerous electro-mechanical connections involved in the complex systems are common sources of failure which produce a high maintenance expense. This expense not only arises due to failures within the central control system itself, but it also arises in connection with failures of remote actuators or sensing equipment, and controllers associated with that sensing equipment. The reason for this is that when failures occur at these remote locations, or in lines connecting the remote locations, prior art systems have typically not provided any means for quickly identifying the location of the failure. As a result, a significant portion of the repair costs arise from time spent in discovering the location of the failure.

The start-up of a typical prior art programmable control system requires many time-consuming procedures such as component selection, design of the operator's panel, purchase and modification of the cabinetry, wiring design with hundreds of connections, and extensive hardware testing and debugging. The design and construction of such systems is generally based on anticipated use of the system in connection with a specified application. Thus, the system is generally not easily adapted for applications other than those originally contemplated. Further, these complex prior art systems generally require extensive rewiring and hardware modification if they are to be expanded in their operations, or adapted for other uses. For example, in a typical expansion of a control system, further input/output connections must be added, with wires being pulled through conduit. The operator's panel must be redesigned and documented, and the software modified. Further, for many systems, it is impossible to adapt the monitoring portion of the system for other applications, and only the central controller can be reused for new applications.

In light of the above, it will be appreciated that it would be an important improvement in the technology to provide a process control system which would adapt easily to a variety of applications, and which would readily permit expansion of the system so that it may grow with the process being controlled, without excessive costs for accomplishing the expansion. Such a system would advantageously include sensing and control modules located remotely from the central control unit and capable of independent diagnosis of the status and operation of its associated controlled process devices, and the capability of a priority communication system to rapidly communicate fault or error conditions to the user via the control unit. It would be a still further improvement in the art to provide such a system which would require a minimum amount of wiring and electrical connections both in the controller as well as in connection with the remote sensing devices.

It would also be an important improvement in the technology to provide such a system which could consolidate information and control operations in a single display arrangement available for an individual user, and provide for simplified operation of the system by use of the interactive control arrangement. Still a further improvement in the art would be provided by a built-in diagnostic capability which would identify the location of hard failures, and which would identify intermittent-fault conditions in order to permit preventive maintenance to be scheduled during normal down time. Still a further improvement in the system would be provided by including in such a system the capability of presenting a check list of corrective procedures in order to overcome a given failure situation.

BRIEF SUMMARY OF THE INVENTION

The invention comprises a novel system and method for controlling processes which is simple in construction, readily expandable, easily adaptable for new applications, user interactive, which provides substantially immediate identification of actual and potential failures, and which makes available diagnostic messages for assisting a user in correcting the condition causing the failure. The system includes a plurality of serially addressable modules which each function independently from a central control unit in monitoring selected process devices and in identifying failure conditions affecting the device and communicating same to the control unit. Specifically, the modules regularly provide updated information as to the status of the process device to which they are electrically and/or mechanically connected. If a failure condition is detected, this information is communicated immediately to the user by means of a priority interrupt through the central controller. The interrupt is initiated by that serially addressable module which detects the failure condition. The modules also detect and identify to the user intermittent faults in order to permit preventive maintenance. The modules also provide a means through which the operation of the process device may be controlled.

The serially addressable modules are electrically interconnected in series configuration through a multiconductor bus such as ribbon cable which carries bidirectional serial data and power to each component in the system. The serial bus electrically connects the components to a control unit which comprises a microprocessor system, a CRT display and a touch screen device for operator/programmer I/O. The control unit functions as an interface between a user and the components of the system, permitting interactive user monitoring of specified process devices, and communicating status information from the modules to the user. The control unit also provides diagnostic information when a failure or intermittent fault has been detected. The module provides an indication of the type of failure and its location, and the diagnostic information includes instructions as to corrective measures which should be taken.

The serially addressable modules may be easily secured at substantially any desired location on the multiconductor bus. Thus, the system may be expanded or modified by adding or moving modules, which snap into electrical connection with the multi-conductor bus at any of numerous locations on that bus. The modules are each internally assigned a desired address to identify specific units. The address is also used for establishing priority among the plural modules on a single bus for accessing the control unit on a priority interrupt basis. The modules may be individually accessed through the control unit through use of the appropriate address which identifies the selected module. After adding a module on the control line and assigning it an address, the control unit is programmed to include the particular address, and the system has then been expanded to include the new module, and to monitor and control the device associated with the new module. Particular device parameters to be monitored and/or controlled are also specified in the module and in the control unit.

These and other advantages and features of the present invention will become more fully apparent from the following description and appended claims taken in conjunction with the accompanying drawings.

BRIEF DESCRIPTION OF THE DRAWINGS

FIG. 3 is an exploded perspective view of a presently preferred embodiment of a serially addressable module and a multi-conductor serial bus of the present invention.

FIGS. 6 through 11 are flow diagrams illustrating the operation of the system control unit of the present invention.

DETAILED DESCRIPTION OF THE PREFERRED EMBODIMENTS

The invention is best understood by reference to the figures wherein like parts are designated with like numerals throughout.

Figure 1:
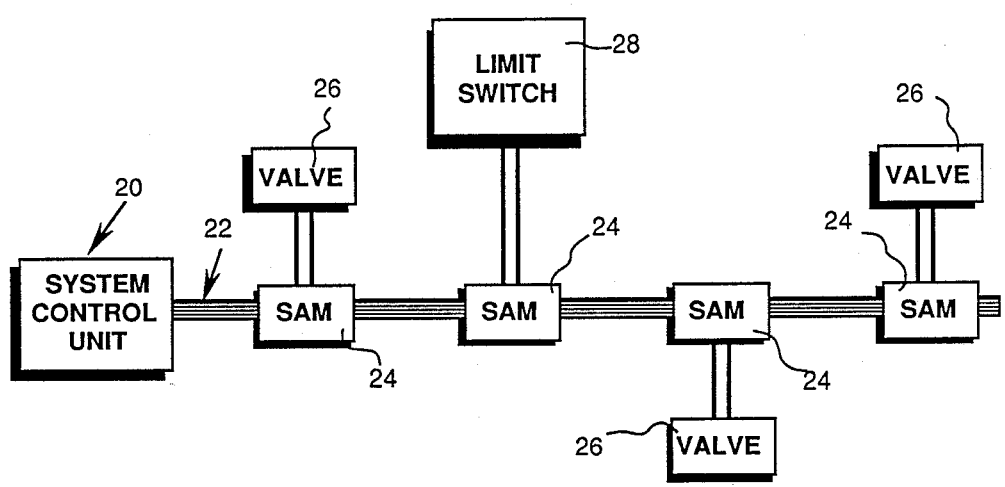
FIG. 1 is a schematic diagram of one preferred embodiment of the system of the present invention.

The system of the present invention can be described generally by reference to FIG. 1, wherein it is seen that the system includes a system control unit generally indicated at 20. Control unit 20 functions as a central control unit for the system, and also as an interface between the user and the system for receiving instructions from users for system operation, and for communicating status and other system information to the user.

Electrically connected to the control unit 20 is a multiplexed input/output serial data bus, such as conventional ribbon cable, generally indicated at 22. Data bus 22 functions as a communications medium for carrying signals between the control unit 20 and one or more serially addressable modules (SAMS) 24 which are electrically connected to the data bus 22 a selected locations.

Each of the SAMS 24 is electrically connected to an element of the controlled process system, such as a valve 26 or limit switch 28. The modules each include components which function independently from the control unit 20 to periodically monitor and retain the status of the process element to which the SAM is connected. Thus, by use of the SAMS 24, the process elements 26 and 28 may be independently monitored and the status of those elements may be communicated via data bus 22 to the control unit 20. Likewise, signals directed to the control of elements 26 and 28 can be communicated from control unit 20 to the respective SAMS 24 via data bus 22.

The configuration of the multiplexed serial data bus 22 and the modules 24 on that bus, permit communication between each of the SAMS 24 and the control unit 20 through that single serial data bus 22. In this series configuration, the control unit 20 may communicate with selected SAMS 24 by addressing the selected SAMS 24 with a series of electrical pulses communicated from control unit 20 onto bus 22 in serial fashion along selected wires of bus 22. This serial configuration allows SAMS 24 to be added or deleted from the system by merely clipping them to, or removing them from, a selected location along bus 22, and revising the data in the controller 20 to properly reflect the changed circumstances. Thus, the series configuration provides for increased versatility in the expansion of the system, as well as in adapting the system for new or different applications.

Figure 2:
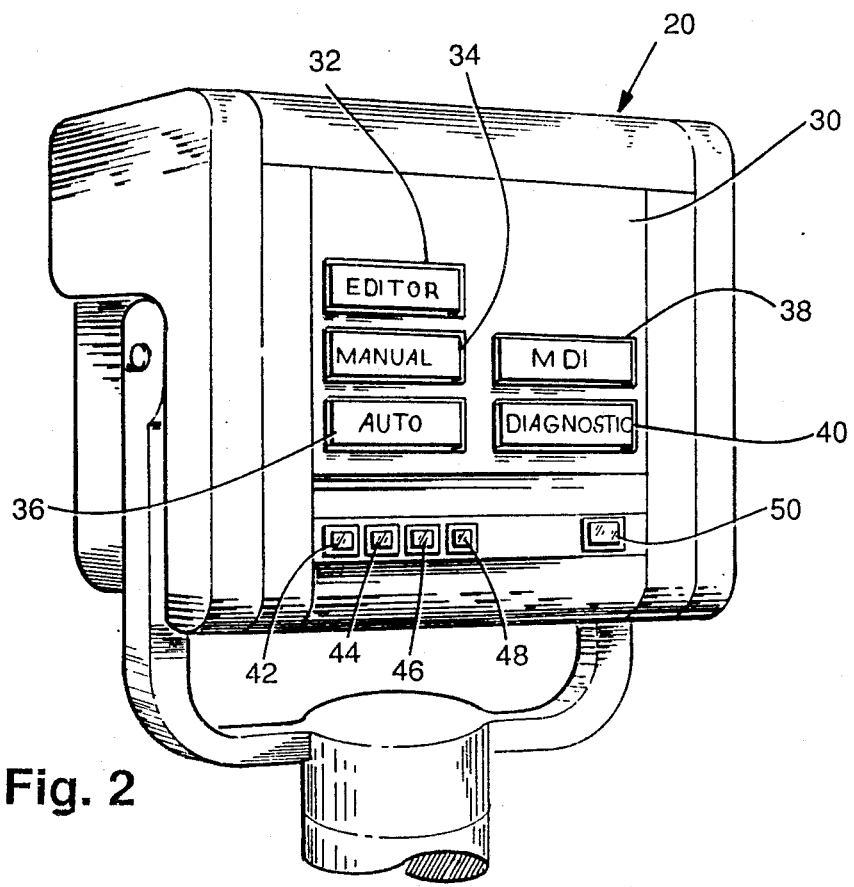
FIG. 2 is a perspective view of a presently preferred embodiment of a system control unit of the present invention.

The system control unit 20 may be described on a functional level by reference to FIG. 2, which illustrates one preferred embodiment of the control unit 20 as it is configured for control of a tube bending process. The control unit 20 acts as a control interface between the user and the various elements of the process to be controlled. The control unit 20 provides a visual indication of the status of selected elements, provides instructions as to location and remedies for system failures, and receives control information from the user for controlling the process. The particular process elements to be monitored, the information produced in response to particular monitored conditions, and also the control commands to be provided to the system by the user may be initially programmed into the machine by the user, and modified at any time. Thus, the system may be adapted for control of any of numerous different processes, and may be readily expanded to control more elements or functions in a given process.

Many of the control functions of control unit 20 are accomplished by means of a touch screen 30 of the type which comprises the screen of a cathode ray tube for visually presenting information, and which receives input from the user by detecting physical contact with, or the presence of an object such as a wand or figure in proximity to, a specific location on the screen 30. In the embodiment illustrated herein, the touch screen 30 utilizes infrared emitters/detectors and decode logic for scanning the surface of the screen to detect and identify the coordinate location of objects contacting the screen. Such touch screen technology is well-known by those skilled in the technology, and is commercially available in many different configurations for use in many different applications.

The information to be presented on touch screen 30 in a given situation, as well as its organization, may be determined by the user and is programmed into the system by the user. In the illustrated embodiment for control of a tube bending process, a portion of the touch screen 30 is designated as a touch switch labeled "EDITOR" 32. In use, the user touches EDITOR 32 to create a machine sequencing program, wherein the system interacts with the user to identify lines, numbers and symbols which are organized by the user to define a relay or ladder logic representation of the desired machine sequence. The user also creates displays on the screen 30 which represent, for example, touch switches which may be activated by the user to initiate the monitoring and control of selected process elements. By this means, the user creates his own operator's panel.

Another section of the screen 30 is designated as a touch switch labeled "MANUAL" 34. In use, the user touches the MANUAL switch 34 and the screen presents several rectangles representing push buttons which activate individual control outputs. For example, in the tube bending embodiment, these rectangles could represent push buttons which could be labeled for specific operations such as "CLOSE CLAMP" or "BOOST ON". By contacting these rectangles on the touch screen, the user may manually activate and test those particular elements of the process. For safety purposes, the embodiment of the system illustrated herein is constructed so that operation of elements of the process requires physical depression of a switch in addition to contact with the touch screen, as will be explained more fully below.

In the illustration of FIG. 2, the screen 30 additionally includes an area designated as a touch switch and labeled "AUTO" 36. Upon touching AUTO 36, one of the touch frames created previously by the user is displayed. The user may then set switches and/or initiate a machine sequence by touching the appropriate screen touch switch which he previously created. If a machine sequence is selected, the ladder logic sequence which was defined by the user previously is executed. This execution is accomplished by the system scanning and storing the status of touch frame inputs from the user, as well as inputs received from SAMS 24 in the system connected to the controller. The controller then sequences through the compiled ladder logic code which was designated by the user, and transmits signals to the appropriate SAMS 24 to control the elements associated with those SAMS in accordance with the logic. This operation continues while the process system functions, and until either a master reset button is pressed or the conditions in the ladder logic prescribe a machine halt.

Still another portion of the screen 30 is designated as a touch switch labeled "MDI" (Manual Data Input) 38. In response to a user touching MDI 38, a selected touch frame previously created by the user appears on the screen. In the illustrated embodiment, the screen would consist of a numeric key pad and labeled fields which could be used by a machine operator to define variables associated with a particular part in the system, such as servo moments, special sequences and the like.

A further area of the touch screen 30 is designated as a touch switch and labeled "DIAGNOSTICS" 40. Upon depressing DIAGNOSTICS 40, the control unit 20 direct program execution to a built-in general purpose diagnostic program which does a self-check and displays the status of all serially addressable modules 24 that are connected to the controller 20. These SAMS 24 can be added to or deleted from the system without reprogramming the diagnostic. If a SAM is determined to be faulty, the identification of the faulty SAM and the logical state of all SAMS is graphically displayed on the touch screen 30. Touching the screen at this point in time will initiate correction instructions previously provided in the system and related to the particular fault.

The control unit 20 includes several switches 42-50 for controlling physical operation of the process. In the illustrated embodiment, switch 42 comprises a button which is depressed as part of a procedure for achieving manual control of selected process elements. Switch 44 comprises a button which is depressed to start process operation. Button 46 comprises a hardware reset which is depressed to initialize the hardware of the control system. Depression of switch 48 stops operation of the process. Switch 50 is an emergency switch which is utilized to shut off power to the system which is being controlled in emergency conditions.

Control of other functions in the system is achieved through use of touch screen technology as explained more fully below. However, switches 42-50 are provided for safety reasons in controlling the physical operation of the process. These switches require positive physcial contact and depression of the switch by the user in order to change the operating status of machinery. This prevents unsafe conditions which could occur through use only of touch screen switches, such as activation of elements of the process as a result of a insect intersecting light beams adjacent the touch screen 30.

The control unit 20 may be contained within a housing of sufficient size to secure the cathode ray tube, and associated hardware, and is typically of a sufficiently small size as to be readily portable. In the illustrated embodiment, this control unit weighs approximately 50 pounds, and is secured in a movable frame on casters or wheels, for transportation between various process systems to be controlled.

Referring now to FIG. 3, the multiplexed I/O serial data bus 2 and the serially addressable module 24 are functionally described. The serial data bus 22 comprises a multi-conductor bus such as ribbon cable having a plurality of conductors organized in a belt configuration. The serial data bus 22 is electrically connected through at least some of its plurality of conductors to the control unit 20. The conductors are connected so as to communicate various signals and data between the control unit 20 and the SAM 24. For example, in one preferred embodiment of the system, data bus 22 comprises fourteen individual conductors 23. These conductors 23 are organized so that the first two communicate SAM address and data information. The next two conductors communicate SAM priority interrupt signals to the control unit 20, while the next four conductors provide address and data information to devices for controlling adaptive processors such as servo mechanisms in the process. Such devices are well-known and commercially available for use in the process control technology. The remaining six conductors provide power and ground connections from the power source in the control unit 20 to the SAMS 24. It will be appreciated that system could be configured so that any of the conductors could be utilized for any of the various functions necessary in the proper operation of the system.

Positioned at spaced locations along bus 22 are connection regions generally indicated at 52 wherein the material which surrounds the conductors does not extend between adjacent conductors, thereby permitting attachment of a conventional electrical connector to the conductors at that location. One such connector is illustrated at 54, and includes a plurality of arms 56 positioned so that channels 58 are formed between adjacent arms. Electrically conductive material is disposed on either side of the arms 56 so that the conductive material is on opposing faces of each of the channels 58. The channels are configured so as to each receive individual conductors therein at the connection regions 52, with the conductive material within the channels being configured so as to pierce any protective material surrounding the conductors at the connection region 52, and to bring the conductive material of the channel into electrical contact with the conductors 23 of data bus 22 at the connection region 52. The electrical connections between the conductors and the conductive material are protected and at least partially secured by a cap 60 which is secured over the ends of the arms 56 of connector 54.

Connector 54 is configured at its other end to receive and secure with a plurality of passages 53 a plurality of male extensions 55 of a board connector 57. The extensions 55 are electrically conductive and are secured in electrical contact to the electrically conductive material which extends onto the opposing faces of the channels 58. The board connector is secured in place by resilient fingers 59 which have a locking tab 61 which is received within a locking channel 63 on a side of connector 54. Electrically connected to the male extension 55 through connector 57 is a printed circuit board 62 with the connections arranged so as to electrically connect the appropriate conductors 23 in data bus 22 with corresponding electrical connections in the printed circuit board 62. The printed circuit board 62 contains the various electronic components which define the SAM 24, and which will be described in detail hereafter.

Projecting from the top end of the SAM 24 is another electrical connector 64 which, in one preferred embodiment, comprises a conventional jack which may be secured to a matching jack to accomplish an electrical connection with a component or element of the process which is to be monitored and/or controlled. Also secured to the printed circuit board 62 are a plurality of switches 66 which are utilized to define a binary address identifying the particular SAM 24. The address which is specified in switches 66 corresponds to the address which is programmed into the control unit 20 for identifying an communicating to the particular SAM 24 during system operation.

In operation, each SAM 24 receive serial data via the conductors 23 from the control unit 20. A microprocessor unit within the SAM 24 evaluates the serial data and determines if that particular SAM is being addressed by the control unit 20. If so, the SAM 24 responds by taking actions in accordance with instructions also comprising serial data, if any, and produces a signal which responds to the serial data received. After producing the response, the SAM 24 returns to it normal processing which includes listening for another message, and continuous self-testing of itself and the process elements being monitored. This cycle is repeated continuously during machine operation. If a SAM 24 does not receive a command from the control unit 20 within a specified interval, a time-out condition is initiated which resets the SAM device. The above scenario is referred to as the normal mode of operation.

In addition to the normal mode of operation, the SAM 24 may also communicate to the central unit 20 in a priority mode. In other words, during normal mode operation, the SAM 24 answers to the control unit 20 only when it is "polled" or addressed. However, in the priority mode, a SAM 24 may initiate a serial priority request by sending a signal on an appropriate conductor in the bus 22. Upon detecting the priority request, the control unit issues a priority acknowledge code and suspends its normal scan sequence, thereby giving the priority requesting SAM 24 immediate attention. By this means, failures or intermittent faults detected by a SAM 24 may be communicated to the user immediately via the control unit 20 without waiting for normal polling of the particular SAM 24.

Figure 4:
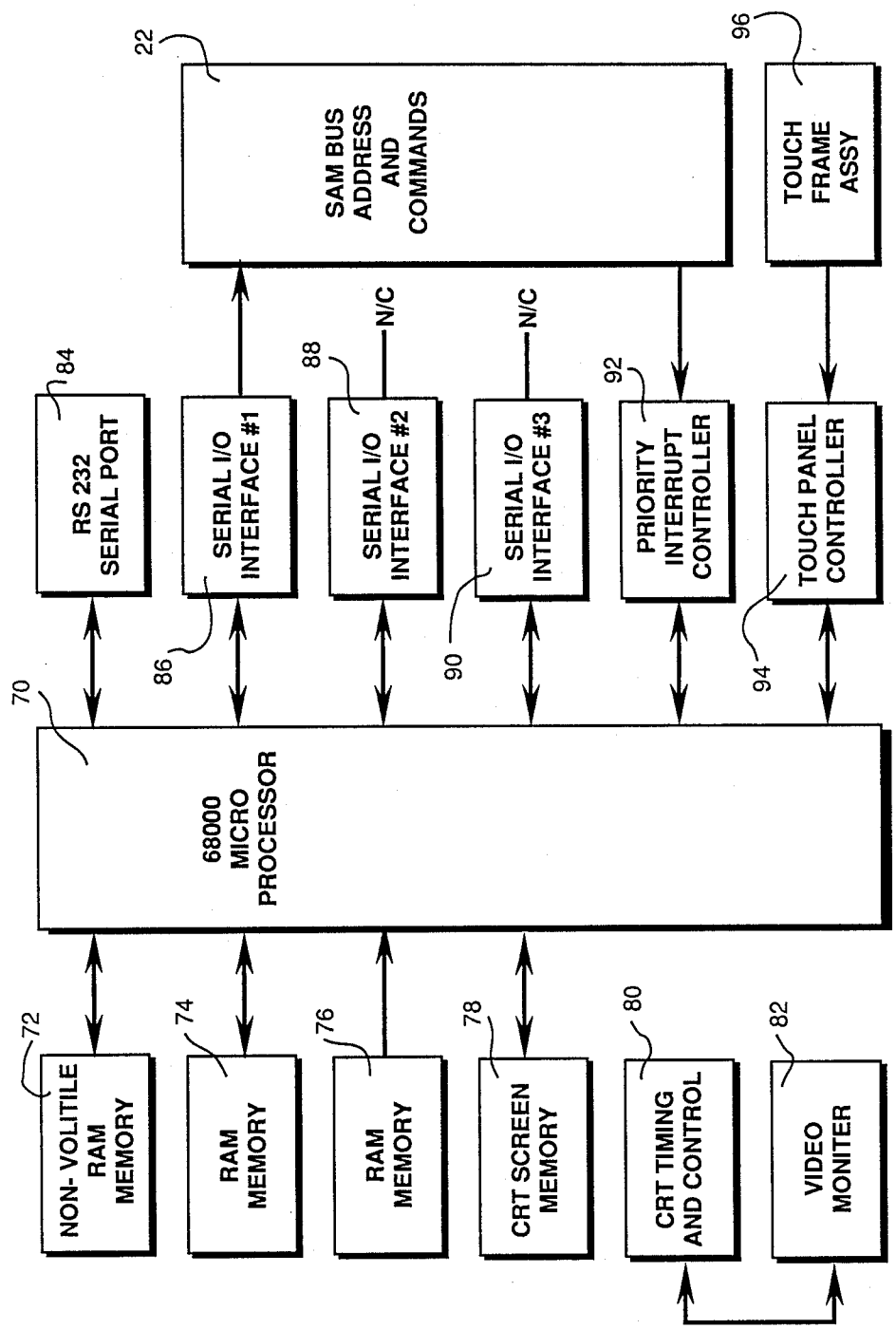
FIG. 4 is a block diagram illustrating the components of a system control unit that may be used in accordance with the system and method of the present invention.

The hardware configuration of the system control unit 20 may be described by reference to FIG. 4. Specifically, the control unit 20 includes a microprocessor 70 for controlling and coordinating the various functions of the control unit 20. The microprocessor 70 may comprise any of numerous types of commercially available microprocessors. One such microprocessor which may be used in the illustrated embodiment is produced by Motorola and is designated as part number 68000L12.

The microprocessor 70 is electrically connected to a non-volatile RAM memory 72 comprising a random access semiconductor memory which retains data intact when power is removed. RAM memory 72 is used to store information, such as programs which are alterable by the user through the control unit 20, and yet which must be held in memory when the power is off. One of the commercially available non-volatile RAM memory devices which may be utilized in the present invention is manufactured by Mostek and identified as part number MK48702B-15.

Microprocessor 70 is also electrically connected to a RAM memory 74 which comprises a random access semiconductor memory which does not retain data when power is removed. This memory is utilized for scratch pad purposes during operation of the system. One particular RAM memory which may be utilized in connection with the device is a static memory manufactured by Hitachi as part number 6116-2. A dynamic RAM memory which may be utilized in the present invention is manufactured by Signetics as part number 8265-15.

The microprocessor 70 is also electrically connected to a read-only memory ("ROM") 76, which is used for storage of the bulk of the program code and data utilized in system operation, and which is not altered during operation of the system. One ROM memory which may be used in the present invention is manufactured by Hitachi as part number HN48271286-25.

Microprocessor 70 is further connected to a CRT screen memory which uses a special section of RAM memory 74 which is reserved to hold the image of the current frame of video information. One CRT screen memory which may utilized in the present invention is manufactured by Texas Instruments Company as part number TMS4416-15NL.

The CRT screen memory 78 is electrically connected to a CRT timing and control subsection 80, which comprises conventional circuitry for generating signals based on the data in the CRT screen memory 78 for visual presentation. The visual presentation is accomplished by an electrical connection between the CRT timing and control subsection 80 and a video monitor 82.

In on preferred embodiment, the video monitor 82 in combination with the CRT timing and control subsection 80 comprises an assembly which is capable of generating a multi-colored display consisting of approximately 250,000 pixels. The pixels are addressed horizontally in groups of 4 per word. They are defined in groups of 3 bits per slice with a word comprising 16 bits, and with 1 redundant bit per slice. The speed of CPU access for any pixel is approximately 800 nanoseconds, and the access is completely independent of refresh circuits associated with the video monitor 82. As a result of the independent access, clean data updates are produced on the screen. Video monitor 82 may be comprised of any of numerous cathode ray tubes which are commercially available. In one preferred embodiment, a 13 inch monitor is used, having a 512×480 line resolution, and 8 color capability.

Microprocessor 70 is also electrically connected to an RS232 serial port 84 for handling communications. The serial port 84 contains conventional electrical circuitry and connection hardware configured in a well-known manner to conform to the EIA-RS232 specification. In addition, microprocessor 70 is electrically connected to serial input/output (I/O) interfaces 86, 88 and 90, each of which contain line drivers and receivers used to communicate commands and data to the SAMS 24. For purposes of discussion, the configuration of the system illustrated in FIG. 4 shows interfaces 88 and 90 as not connected. In operation, the illustrated system is capable of handling three individual serial busses 22, which are each connected to one of the interfaces 86, 88 or 90.

Interface 86 is electrically connected to conductors 23 (FIG. 3) in a data bus 22 which carry SAM addresses and command data. As was previously indicated, several conductors 23 in the bus 22 are utilized for transmitting address and command data to the SAM modules 24, while other conductors in the bus are utilized for purposes such as providing power to the elements of the system.

Microprocessor 70 is additionally electrically connected to a priority interrupt controller 92 which itself is electrically connected to conductors in the data bus 22 for communicating priority interrupt requests from the SAMS 24 to the control unit 22. The priority interrupt controller 92 contains circuitry which receives the interrupt request signals from data bus 22, and produces an interrupt signal which is read by microprocessor 70.

Microprocessor 70 is also electrically connected to a touch panel controller 94 which itself is electrically connected to a touch frame assembly 96. The touch pane controller 94 receives digital signals from the touch frame assembly, and functions as an interface device between the touch frame assembly 96 and the microprocessor 70.

The touch frame assembly 96 preferably comprises 32 infrared light beams configured in a 16×16 matrix about the periphery of a screen of the video monitor 82. The light beams are produced and utilized by commercially available LED emitters and receivers. One type of touch frame emitter which may be utilized in the present invention is produced by Texas Instruments as part number TIL31. A touch frame receiver which may be utilized in the present invention is produced by Texas Instrument Company as product number TIL81.

The touch panel controller 94 and touch frame assembly 96 function in combination to receive a 3-bit strobe code from the microprocessor 70, and in respone thereto to cause one of eight emitters to be driven at a modulation frequency supplied by the source clock of a phase-locked-loop circuit. At the same time, the identical 3-bit code is utilized to enable one of eight receivers to respond to this frequency, and produce a feedback signal which is transmitted to the phase-locked-loop input. Thus, in a normal uninterrupted scan, the phase-locked-loop always "sees" the frequency it produced, and responds with an active (low) feedback to the microprocessor 70. When an object such as a finger interrupts the light beams, the touchscreen outputs remain inactive (high) and a point on the matrix is identified by its "x" and "y" coordinates. This information is communicated from the controller 94 to the microprocessor 70.

Figure 5:
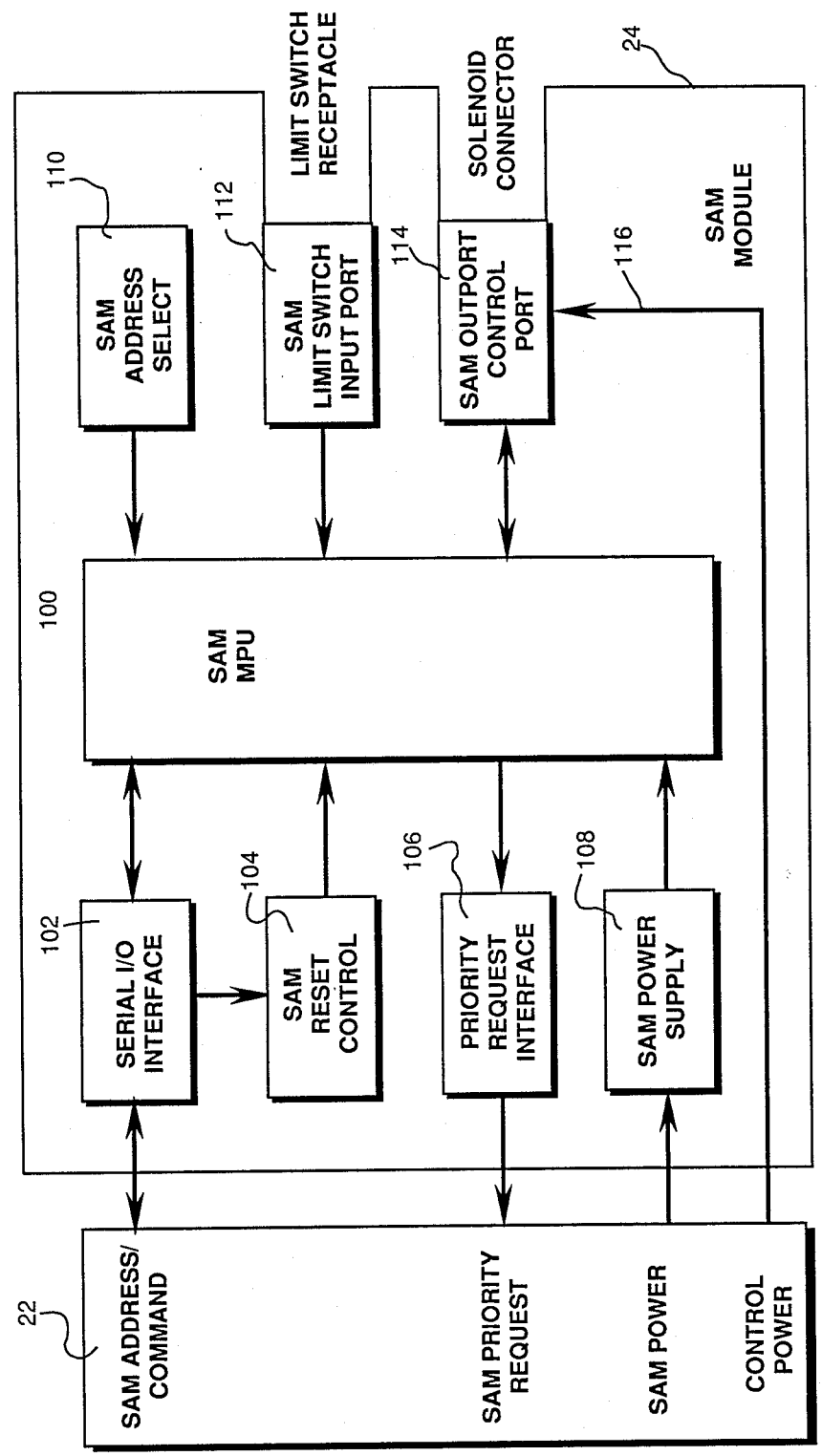
FIG. 5 is a block diagram illustrating the components of a serially addressable module that may be used in accordance with the system and method of the present invention.

By reference to FIG. 5, the components of the SAM modules 24 may be described. Specifically, control and operation of the various components of the SAM 24 is accomplished by a microprocessor unit 100, which preferrably may comprise a Motorola MC6801 microprocessor which includes an on-board RAM for use as a scratch pad memory in system operation. The microprocessor 100 is electrically connected to communicate with a serial I/O interface 102 which contains line drivers and receivers used to communicate commands and data between the SAM 24 and the control unit 20. One preferred serial I/O interface for accomplishing this purpose is a Texas Instruments transceiver chip assigned par number TI75/176, which converts the differential digital signal received from the line to bipolar digital form.

The serial I/O interface 102 and the microprocessor 100 are electrically connected to a SAM reset control 104 which comprises a monostable multivibrator which provides a reset to the SAM microprocessor 100 when no transmission is detected after a specific time interval which, in one preferred embodiment, is 30 milliseconds. Thus, the serial I/O interace 102 functions in a static condition to hold the reset signal on the microprocessor 100. When any kind of information passes through the serial I/O interface 102, this information causes the reset control 104 to release the reset of the components of the SAM 24 through the microprocessor 100. Thus, the monostable multivibrator is configured as a watch dog timer, which may be comprised of any of numerous conventional devices available on the market. One such device which may be used with the present invention is manufactured by RCA as part number RCA4538B.

The microprocessor 100 is also connected to a priority request interface 106 which itself is connected through the priority request line in the bus 22 to the priority interrupt controller 92 (FIG. 4) and ultimately to the microprocessor 70 of the control unit 20. Priority request interface 106 is identical in hardware to the serial I/O interface circuit 102, but is utilized for processing priority request signals sent from the microprocessor 100 to the control unit 20.

Microprocessor 100 is also connected to a SAM power regulator 108 which itself is connected through a line in the bus 22 to a power source. Power regulator 108 comprises a conventional voltage regulator which functions to ensure that a stable voltage level is supplied to the microprocessor 100.

One voltage regulator which may be utilized with the present invention is produced by National Semiconductor as part number U87805. The microprocessor 100 is additionally electrically connected to a SAM address select 110. The address select 110 comprises a series of switches which may be conventional, mechanical switches and which are electrically connected to the microprocessor 100 for indicating the address assigned to the particular SAM 24. Alternatively, the switches may comprise storage registers into which is communicated address data to identify the particular SAM 24.

Microprocessor 100 is also connected to a SAM limit switch input port 112 which comprises a port to which a conventional limit switch receptacle or connector is electrically coupled. This input port 112 is used in order to monitor the status of a process component, such as a switch, which is connected to the SAM 24 through the input port 112. Thus, the limit switch input port may be selected from among the many conventional devices for detecting the position of switch contacts. For example, one device which may be utilized with the present invention is an opto-isolator manufactured by General Instruments as part number MCA11G1. Such a device optically identifies the open or closed status of a switch contact, and converts this to an electrical signal for transmission to the microprocessor by use of a pull-up resistor which is pulled down to ground level if the switch is open, and is at a high of 5 volts when the contact is closed. Thus, it is sen that both the normally-open ad normally-closed contacts of the switch are monitored for diagnostic purposes.

The microprocessor 100 is additionally connected to a SAM output control port 114 which is configured to receive a connector, such as a solenoid connector, in order to electrically connect the microprocessor 100 to a dynamic device such as a solenoid. The output control port 114 communicates status signals from the output device (not shown) to the microprocessor 100 for internal use and for transmission to the control unit 20. In addition, the output control port communicates signals from the control unit 20 via the microprocessor 100 to the dynamic device in order to control the operation of that device. The output control port 114 controls the operation of the dynamic device in response to instructions received through the microprocessor 100 by applying power to the dynamic device to drive the device in a desired direction. The power for accomplishing this purpose is received through a control power line 116 which electrically connects the control port 114 through the bus 22 to a source of control power. This control power will be of the magnitude necessary to effect control of the particular output device. For example, the control power may be provided at 24 volts DC or it may be, for example, 110 volts AC, as required to drive the solenoid or similar dynamic device which is controlled through output control port 114.

One valuable feature of the system described herein is that it is readily expanded by adding SAMS 24 onto the data bus 22 for controlling selected elements or components of the process system. The procedure for expanding the system by adding a SAM 24 to the system may be best understood by reference to FIG. 6. Initially, the expansion of the system is begun by the step indicated at 120 comprising adding a connector (54 of FIG. 3) to the data bus 22. With the connector secured to the data bus, the SAM connector 57 is plugged into the connector 54 in step 122, to achieve an electrical connection between the SAM 24 and the bus 22.

In step 124, the address is set in the SAM 24. In one preferred embodiment, this is accomplished by setting the address on switches 66 of FIG. 3. In step 126, an I/O device such as a switch or servo controller (not shown) is connected to the jack 64 of the SAM 24. This connection is made so that the I/O device may be monitored and/or controlled by the process control system through the SAM 24.

Knowing the particular address assigned to the new SAM 24 and with an understanding of the functions to be monitored or controlled, a user in step 128 utilizes a screen editor via the screen 30 of control unit 20 to reconfigure the touch frames on the screen 30, and to include a frame relating to the address of the newly added SAM 24. In step 130, the user utilizes a ladder editor to modify control logic in the system, producing an electronic representation of the system including the newly added SAM 24, and representing the process device which is controlled through the new SAM 24. In step 132, the user may initiate operation of the system, which incorporates the new SAM 24.

The function and operation of one preferred embodiment of the serial control unit 20 may be described by reference to FIGS. 7-11. Referring initially to FIG. 7, the operation of the control unit 20 is initiated in a power on or reset condition 140. Having initially received power, or having been reset, the control unit 20 passes from block 140 to block 142 where all registers and I/O devices in the control unit 20 are initialized. With the system initialized, the control unit passes to block 144 wherein the interrupts are enabled. Within block 144, the system functions in a continuous loop to accomplish the enablement of interrupts by means of an interrupt loop illustrated generally at 146 which repeats, in one preferred embodiment, every 1.1 milliseconds.

The interrupt loop 146 comprises a block 148 wherein the touch screen status is input to an I/O RAM 74 (FIG. 4) for temporary storage. From block 148, the system passes to 150 and reads the input SAMS 24 which provide an indication of the status of devices such as switches. This status information is stored in another location in the I/O RAM 74.

From block 150, the system passes to block 152 and communicates any output information which is to be transmitted from the I/O RAM 74 to the output SAMS 24, which monitor and control dynamic devices such as servo mechanisms or solenoids. This output information typically comprises control data which is utilized in activating desired operation of the dynamic devices. From block 152 the system passes to block 154 and updates the cursor position on the screen 30 of the serial control unit 20. From block 154, the system repeats the interrupt loop by passing again to block 148 and repeating the process described above.

With the interrupts enabled, the control unit passes from block 144 to block 156 wherein a mode select screen is displayed on the control unit 20. The mode select screen presents operational options for selective use by the user. With the mode select screen displayed in block 156, the system moves to block 158 where it waits for the user to select one of the displayed modes. The user may select from among execute, diagnostic and program modes. These modes are described individually below.

The execute mode may be described by reference to FIG. 8. Upon receiving an indication from the user via screen 30 that the system is to function in the execute mode, the system passes to block 160 of FIG. 8 where it accesses the I/O RAM 74 and obtains the current status of inputs, as they were recorded in block 150 of the interrupt loop of FIG. 7. Having the current status of the inputs from the I/O RAM, the system moves to block 162 where it sequences through the compiled ladder logic codes in order to scan those codes, turning the output SAMS 24 on or off as dictated by the logic and by the status of the inputs, and storing the output states of those SAMS 24 indicated in that ladder logic. From block 162, the system moves to block 164 and stores the output states in the I/O RAM 74.

From block 164, the system passes to block 166 and determines whether a new screen is to be created. During the scan of the ladder logic in block 162, code may be encountered which instructs the system to present a new screen on the video display. This new screen is one which was previously defined by the user in the process described with reference to blocks 128 and 130 of FIG. 6. If no new screen is to be created, the system passes back to block 160 and continues to repeat the above-described steps until such time as the user selects one of the other modes in block 158. If in block 166, the logic indicates that a new screen is to be created, the system passes to block 168. At this time, the system forms a new screen display which has been previously defined by the user, and presents this on screen 30 of the control unit 20. This display may present the touch switch locations identifying the various SAMS 24 in the system. After writing this new screen display, the system passes to block 170. During the scan of the ladder logic in block 162, logic code may be encountered which instructs the system to implement new touch switch locations which were defined by the user in blocks 128 and 130 of the process illustrated in FIG. 6. The instruction to implement the new touch screen locations is implemented in block 170. After completing the activities in block 170, the system returns to block 160 and continues operation in the execute mode until the user halts the sequence by pressing switches 46, 48 or 50.

If the user selects the diagnostic mode in block 158, the system passes to block 172 of FIG. 9 and displays the current state of each of the 64 I/O addresses stored in the I/O RAM in block 150. From block 172, the system passes to block 174 and therein determines whether any I/O errors have occurred. If no error has been detected, the system returns to block 172 and repeats the steps described above. In the event that an I/O error has been detected in block 174, the system moves to block 176 and displays in red the address of the SAM 24 which has experienced the failure. Good addresses are displayed in green.

From block 176, the system passes to block 178 and determines whether a user has touched the screen 30 (FIG. 2). If a user has not touched the screen 30, the system returns to block 172 and continues to function as described above. If the user has touched the screen 30, the system passes from block 178 to block 180 and presents on the screen 30 the correction procedures which have been programmed into the system to correspond to the type of error which has been detected at the particular address of the SAM 24 experiencing the fault.

From block 180, the system passes to block 182 and determine whether the user has touched the screen 30. If the user has not touched the screen 30, the system continues to wait in block 182 and the correction procedures continue to be visually presented. Upon detecting a touch on the screen 30, the system passes from block 182 to block 172 and functions as described above.

Figure 10:
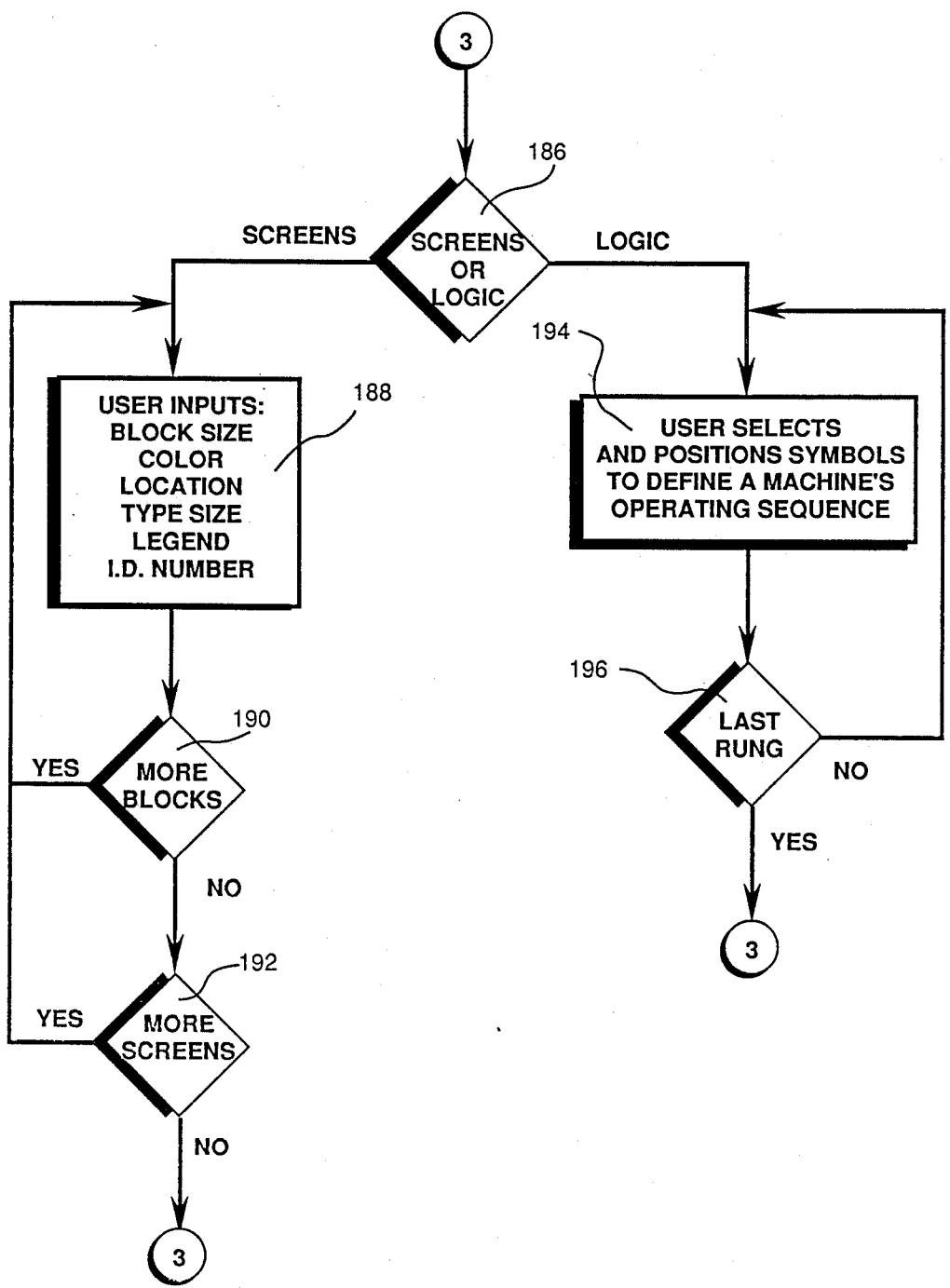
Figure 11:
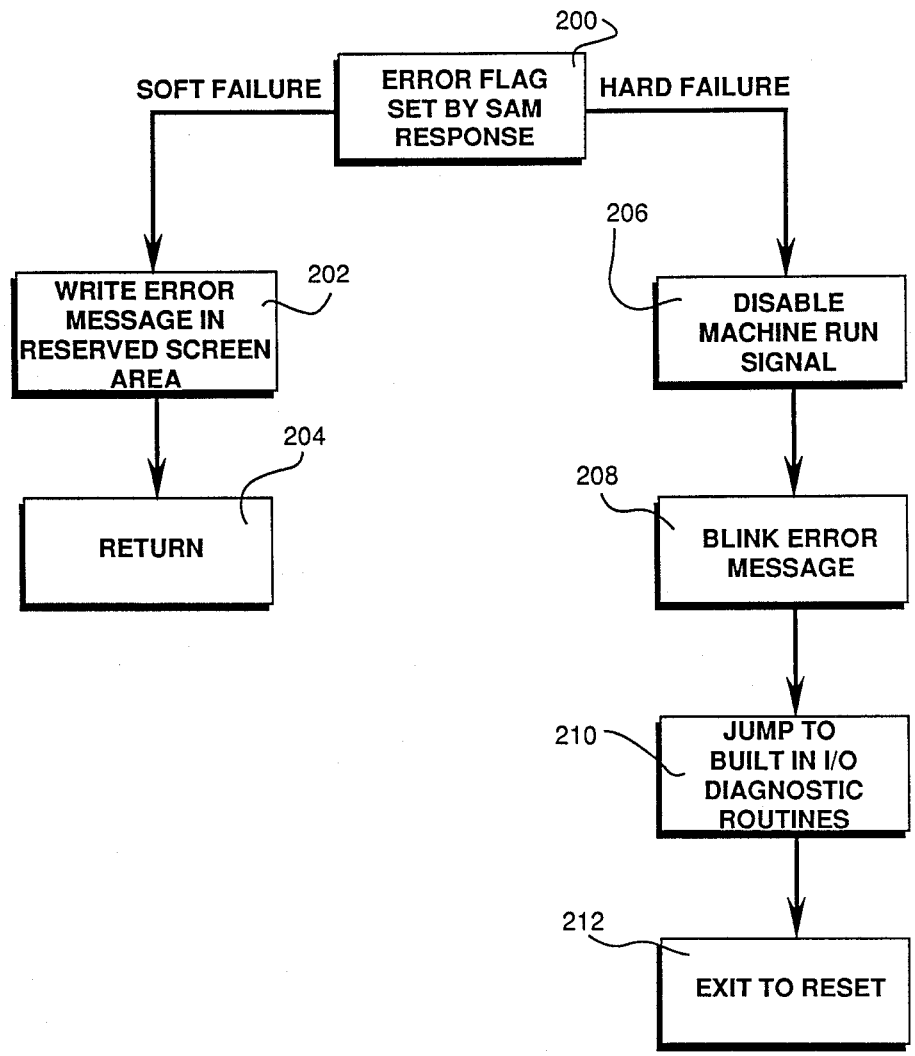

If, in block 158 of FIG. 7, the user selects the program mode, the system passes to block 186 of FIG. 10. In block 186, the system waits for an indication from the user as to whether he wishes to program a new screen of information on the screen 30 of the control unit 20, or whether the user wishes to program information relating to the operation of the system, referred to as logic. If the user has selected to program the screen, and has indicated this preference by touching the appropriate portion of the screen, the system moves from block 186 to block 188 where it functions to prompt the user to input information, via the touch screen, including such things as block size, color, location, the type size the particular legend and the identification number of the SAM 24 to be associated with this block on the screen.

After creating the screen display in accordance with the user's instruction, the system moves to block 190 and determines whether the user wishes to create more blocks. The user indicates a desire to create more blocks by touching an appropriate location on the touch screen 30 of the control unit 20. In response to an indication by the user that more blocks are t be created, the system passes from block 190 to block 188 and functions as indicated above. If no more blocks are to be created, the system passes from block 190 to block 192 where it is determined whether the user wishes to create more screen displays.

If the user desires to create an additional screen display for use in defining, controlling, and operating the system, he indicates this desire by touching the screen 30 at the appropriate location. If an indication that more screen displays are to be created is detected, the system passes from block 192 to block 188 and functions as described above. If no more screen displays are to be created, the system passes from block 192 to block 186 and awaits a further indication from the user as to whether screen displays or logic are to be created.

In the event that logic is to be created, the system passes from block 186 to block 194 and prompts the user to select and position symbols which define a machine's operating sequence. These symbols define a ladder network, including particular components or elements of the process system which is being controlled. The functions of these devices, and the particular information to be controlled and/or monitored are identified in a separate screen created in block 188.

After a particular symbol is selected to identify a particular rung in a machines operating sequence, the system passes from block 194 to block 196 and determines whether this is the last rung in the sequence. The user indicates that more rungs are to be added by touching the appropriate location on screen 30 of the control unit 20. If this is not the last rung to be added, the system passes from block 196 to block 194 and functions as indicated above. If this is the last rung to be added, the system passes from block 196 to block 186 where it awaits further instructions from the user.

As will be explained more fully hereafter, the SAMS 24 detect fault conditions associated with the components of the process with which they are electrically connected. The SAMS 24 detect permanent faults, which may be referred to as "hard failures", as well as intermittent faults such as excessive noise on a switch contact or intermittent open circuits on a line, which may be indicative of future hard failures, and which may be referred to as "soft failures". By referring to FIG. 11, it is seen that in response to the detection of a fault, the SAMS 24 produce a response causing the setting of an error flag by the control unit 20 in block 200. If the error flag set in block 200 indicates a soft failure, the system passes to block 202 and produces an error message which is presented visually on screen 30 in a reserved area. Preferably, the error message identifies the particular SAM 24 which detected the error, in addition to identifying the type of error detected. Upon receiving an acknowledgment from a user, the system passes from block 202 to block 204 and returns to normal operation.

If the error flag set by the SAM 24 in block 200 indicates a hard failure, the system passes to block 206 wherein the control unit 20 produces a disable machine run signal which stops operation of the machinery being controlled. From block 206, the system next passes to block 208 and produces a visual error message on screen 30. Preferably, this error message is caused to blink on and off in order to more quickly draw the attention of the user. Upon receiving a response from the user, the system passes from block 208 to block 210 where it presents to the user appropriate diagnostic messages which are produced by I/O diagnostic routines performed by the control unit 20 in block 210. In response to a user command, the system passes from block 210 to block 212 which terminates operation of the error correction routine, with the system then passing to block 140 of FIG. 7 to reset the system in order to again initiate system operation.

The operation of the full system includes operation of the control unit 20 as described above, as well as the operation of the individual SAMS 24. The operation of the SAMS 24 can best be described by reference to FIGS. 12–16.

Figure 12:
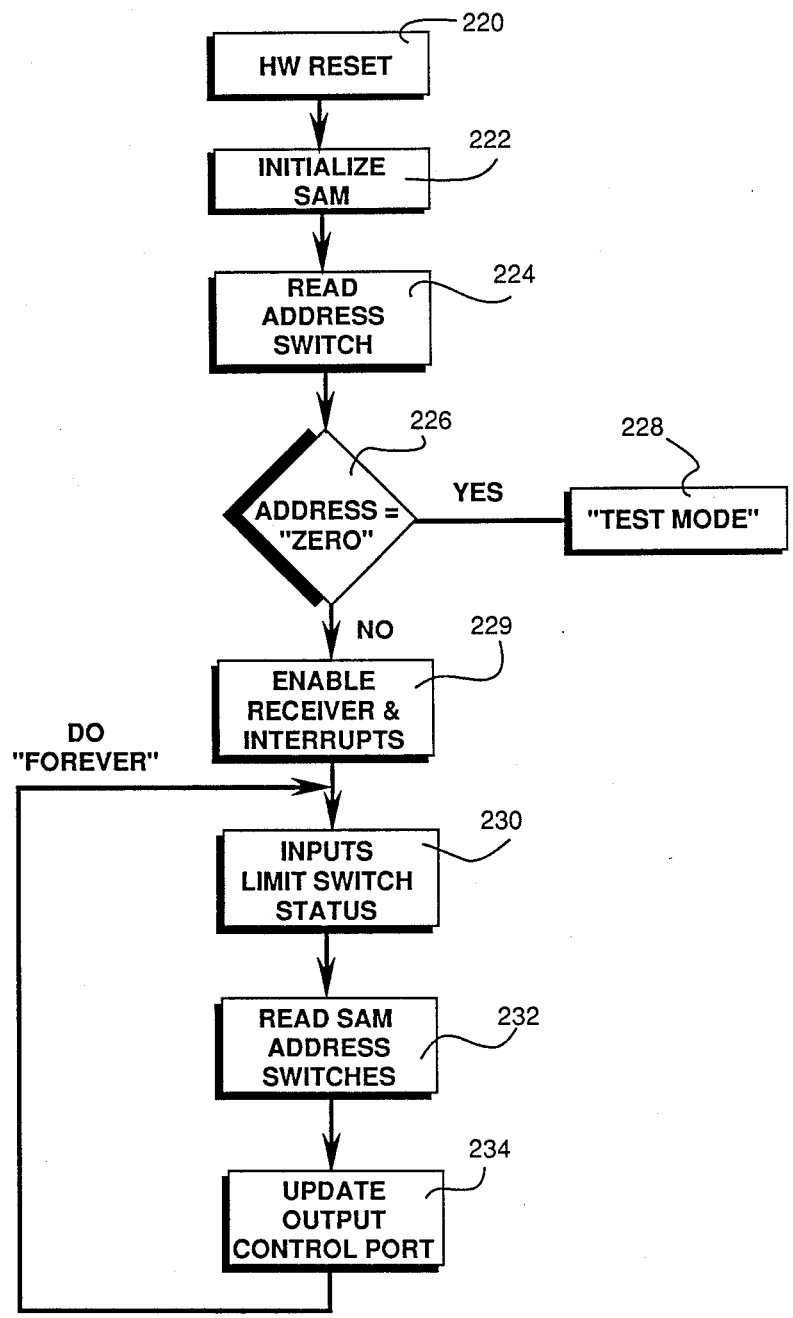
FIGS. 12 through 16 are flow diagrams illustrating the operation of the serially addressable module of the present invention.

Referring initially to FIG. 12, it is seen that SAM 24 operation is initiated by the SAM device accomplishing a hardware reset function as indicated in block 220. The hardware reset is accomplished by sending reset enable signals to the various hardware components which comprise the SAM 24. Following the reset function, the SAM 24 passes to block 222 and produces signals which initialize the components of the SAM 24. After initialization, the SAM 24 passes to block 224 and reads the address switches 66 (FIG. 3). After reading the address switches 66, the SAM 24 passes to block 226 and determines whether the indicated address is zero. If the address is zero, the system passes to block 228 and performs a self-test function.

In testing itself, the SAM 24 performs a RAM test, a ROM test and an instruction test. These tests preferably comprise well-known methods of testing the various components and information in the SAM 24. For example, in the RAM test, the microprocessor 100 of FIG. 5 reads what is currently stored in one location of the internal RAM of that microprocessor, and stores this in a safe register. The microprocessor 100 then writes into the RAM location, and reads that data back again to check if what it read back agrees with what it wrote in. Following this test, the microprocessor 100 puts the original data back into the RAM at its original location, and continues on to the next RAM location.

In the ROM test, the microprocessor 100 reads all of the locations of the internal ROM of that microprocessor and performs a conventional travelling check of that data. In order to accomplish an instruction test, the system performs various instructions and tests the results against known results. For example, to test the add instruction, the system adds two registers which contain known quantities. The resulting sum is compared against another register which has the correct sum stored in it. Of course, if the compared sums are identical then the add instruction is determined to be operating properly.

In the event that a fault conditioner error is found in the test mode, a signal is generated by the SAM 24 for transmission on a priority basis to the control unit 20 indicating the presence of an error in the SAM 24. The procedure for accomplishing this priority request arrangement is described more fully hereafter.

If the address identified in block 224 is found in block 226 to be other than zero, the SAM 24 passes to block 229 where it enables receivers and interrupts so that signals may be received during system operation, and interrupt signals may be produced if error conditions are detected.

From block 229, the SAM 24 passes to block 230 where it stores data in a RAM location identifying the status of limit switches which may be monitored and controlled by the SAM 24. The process of testing and identifying the limit switch status which is accomplished in block 30 is explained more fully hereafter with respect to FIG. 13.

From block 230, the SAM 24 passes to block 232 where it reads the address lines of bus 22 to determine whether the particular SAM 24 is being addressed by the control unit 20. The SAM 24 then passes to block 234, wherein the microprocessor unit 100 passes control data received from the control unit 20 via bus 22 and interface 102 to the output control port 114 (FIG. 5). By updating the output control port 114 with this information, appropriate control of solenoids and similar devices connected to the output control port 114 may be accomplished.

From block 234, the SAM 24 returns to block 230, and continues to perform the operation of blocks 230, 232 and 234 as described above in a continuous fashion until a power-off or other condition causes the system to move to block 220 and operate as describe previously.

Figure 13:
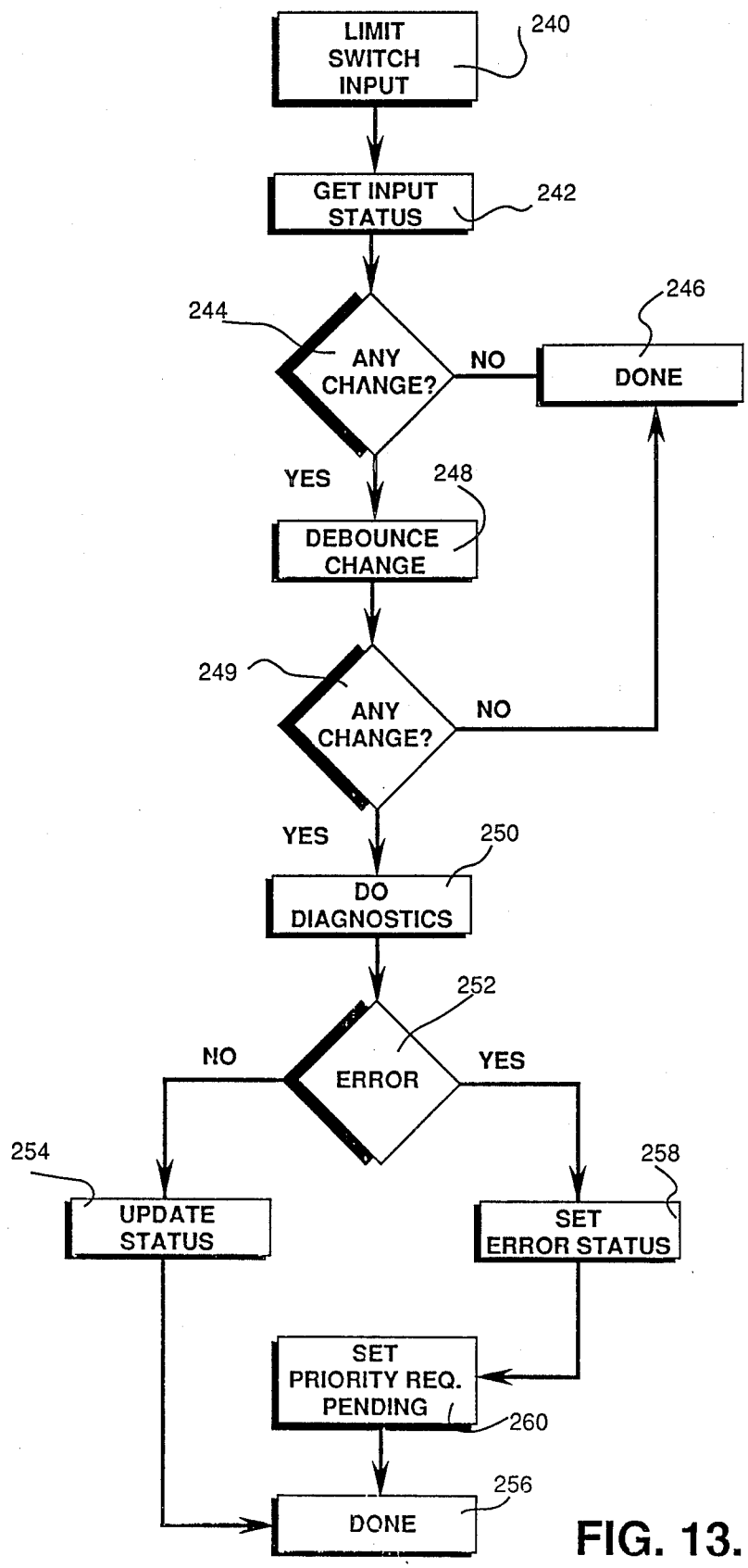

Referring now to FIG. 13, the tasks which are accomplished in block 230 of FIG. 12 may be more fully described. Upon entering block 230 of FIG. 12, the microprocessor 100 passes to block 240 of FIG. 13, where it monitors the SAM 24 limit switch input port 112 (FIG. 5) to obtain the current status of the limit switch input. This status is stored in a RAM internal to the microprocessor 100. From block 240, the SAM 24 passes to block 242, wherein the microprocessor 100 retrieves the input status which was previously received through limit switch input port 112, and which has been stored in the internal RAM. From block 242, the SAM 24 moves to block 244 where the current limit switch input obtained in block 240 is compared with the previous input status obtained in block 242. If no change between the input status is detected, the SAM 24 moves to block 246 where it provides an indication of the present, unchanged, status of the limit switch to block 230 of FIG. 12.

If a change in status is detected in block 244, the SAM 24 passes to block 248 and waits for a set period of time so that the status of the limit switch may become stable. At the end of this time, the SAM 24 passes to block 249 wherein the microprocessor 100 again compares the present status of the limit switch received through the input port 112 with the status obtained from the RAM in block 242. If there is no change, the SAM 24 returns to block 246 and functions as indicated above. If a change continues to be present, the SAM 24 passes to block 250 wherein it performs a diagnostic evaluation of the limit switch to determine whether an error condition is present. The diagnostic procedure utilized in block 250 is described hereafter with respect to FIG. 14.

Upon completing the diagnostic procedure, the SAM 24 passes to block 252 and checks to see whether an error flag has been set during the diagnostic procedure. If no error flag has been set, the SAM 24 moves from block 252 to block 254 and the microprocessor 100 updates the input status by storing the current changed status in the RAM location which is accessed in block 242 of FIG. 13. The SAM 24 then passes to block 256 and provides an indication of the current limit switch status to block 230 of FIG. 12.

If an error flag is detected in block 252, the SAM 24 passes to block 258 wherein an indication that an error exists is stored by microprocessor 100 in a selected RAM location. From block 258, the SAM passes to block 260 wherein the microprocessor 100 sets a flag in an internal register indicating that a priority request is pending. The interrupt processing routine which indicates errors to the control unit will be described subsequently with reference to FIG. 15. From block 260, the SAM 24 passes to block 256 and the microprocessor 100 provides the current input limit switch status as necessary in the performance of operation in block 230 of FIG. 12.

Figure 14:
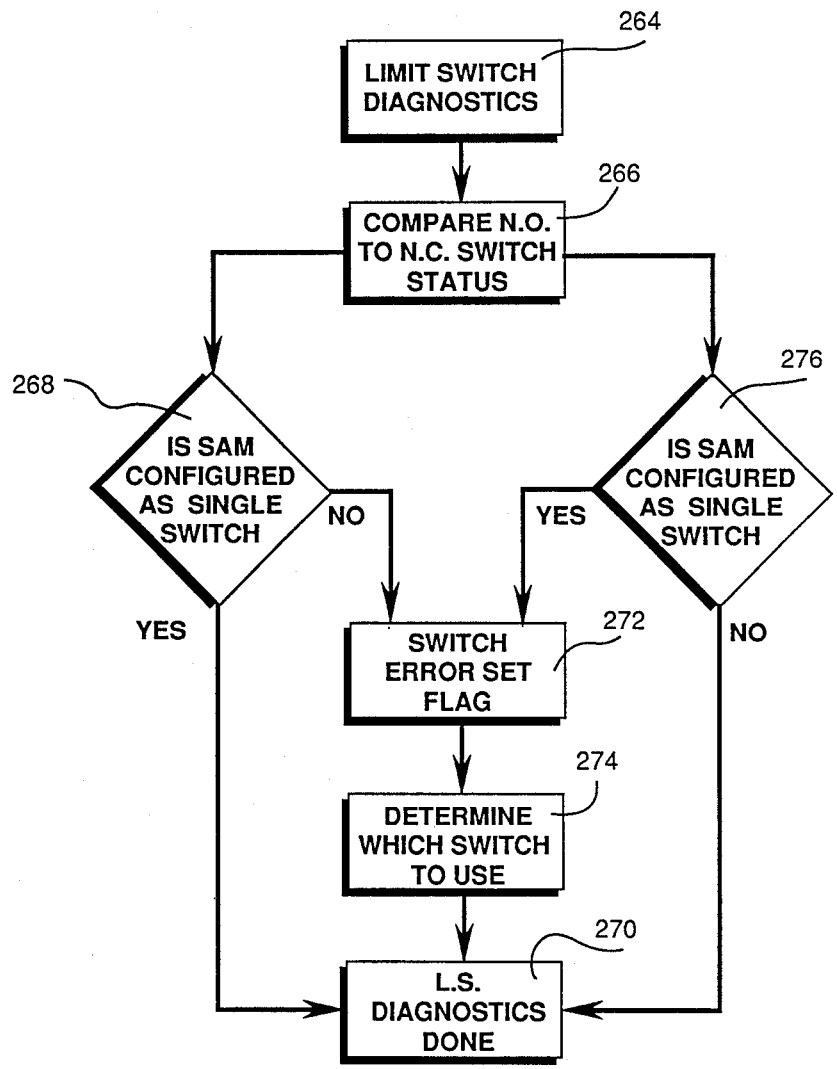

The diagnostic procedures accomplished in block 250 of FIG. 13 may be described by reference to FIG. 14. Specifically, the SAM 24 begins the diagnostic procedure of block 250 by passing to the initial state illustrated in block 264 of FIG. 14. In block 264, the SAM 24 refers to the previously identified switch configuration and obtains the status of the normally-open and normally-closed switch contacts. Upon obtaining this status information from the switch input port 112 of FIG. 5, the SAM 24 moves to block 266 wherein the microprocessor 100 compares the status of the normally-open switch to the status of the normally-closed switch.

If the comparison in block 266 produces a result indicating that the normally-open and normally-closed switch status is the same, the SAM 24 passes to block 268 wherein the microprocessor 100 accesses a storage register which indicates whether the monitored switch is configured as a single switch. If the monitored switch is configured as a single switch, the SAM 24 passes to block 270 and terminates operation without finding an error. In the event that the switch is not configured as a single switch, then it is assumed that it is configured as a double-pole switch. Since the normally-open and normally-closed contacts of the double-pole switch could not be in the same state except under an error condition, the SAM 24 passes from block 268 to block 272 where a switch error flag is set in a storage register by microprocessor 100.

The SAM next proceeds to block 274 wherein the microprocessor 100 accesses a previously stored protocol to determine which switch contact to utilize as the correct indication of switch status. In one preferred embodiment for accomplishing this, the microprocessor in block 274 communicates a priority request signal through interface 106 to the SAM 24, and requests instructions from the user as to which switch terminal to monitor. After determining which switch to use, the SAM 24 passes from block 274 to block 270 and terminates operation of the diagnostics procedure.

In block 266, if the normally-open and normally-closed switch status is different, the SAM 24 passes to block 276 wherein the microprocessor 100 checks previously stored priority information to determine whether the switch is configured as a single switch. If the switch is not configured as a single switch, the SAM 24 passes from block 276 to block 270 and terminates further operation.

If the switch is configured as a single switch, then the SAM 24 passes from block 276 to block 272 wherein it sets a switch error flag and otherwise functions to perform the appropriate activites in blocks 272, 274 and 270 in the manner described above.

Figure 15:
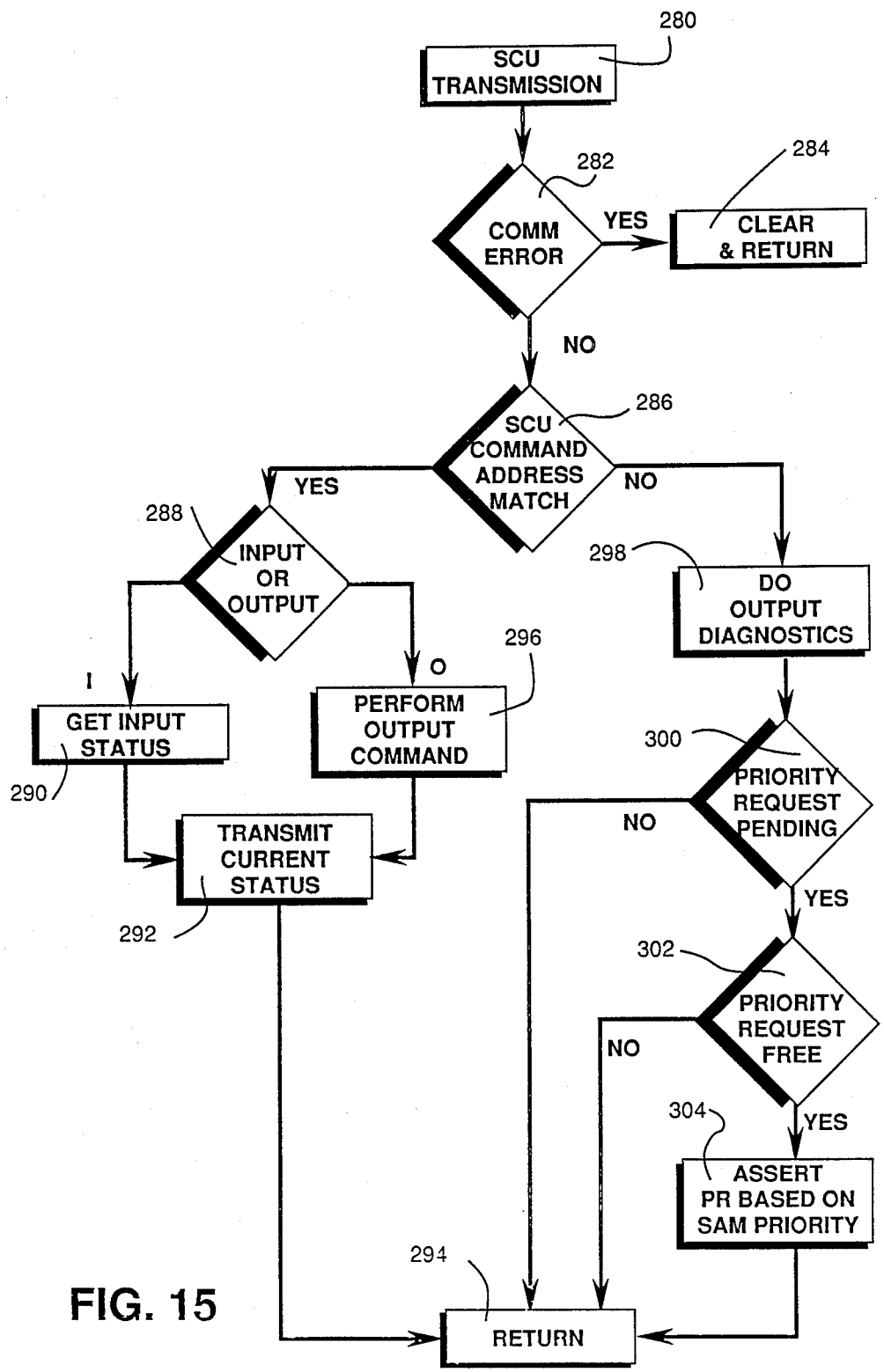
Figure 16:
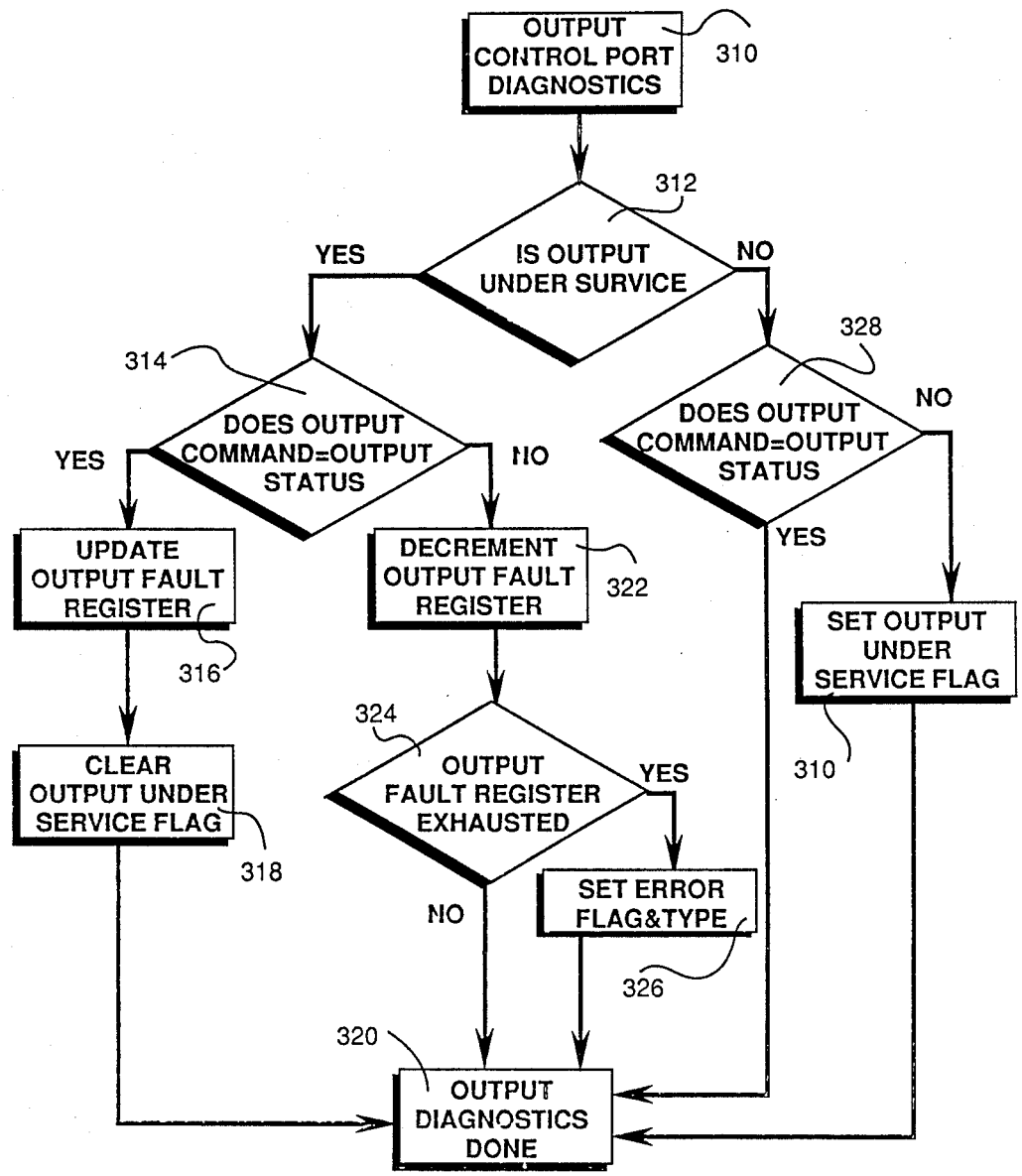

The priority request pending block 260 of FIG. 13 produces a signal which is utilized in the interrupt processing routine which is described with respect to FIG. 15. Referring more specifically to FIG. 15, it is noted that the SAM 24 may initiate this interrupting procedure by detecting a transmission from the serial control unit 20 in block 280. The SAM next passes to block 282 and conducts tests to determine whether there is a communications error. This test is accomplished by conventional means such as sending a byte of information received by a SAM 24 from the control unit 20 back to the control unit 220, and having the control unit check the data by comparing it to the data originally sent to confirm that it is the same. In addition, the SAM 24 checks the byte, using conventional testing methods for parity errors as well as for framing and timing errors. If an error is detected, the SAM 24 passes to block 284, clears its registers containing the transmission and returns to the operation which was being performed at the time the interrupt condition was initiated.

In the event that a communication error is not detected in block 282, the SAM 24 passes to block 286 and the microprocessor 100 compares the present address from the control unit 20 with the SAM address which has been assigned internally to that SAM 24. If the command address matches the address of the SAM, the SAM 24 passes to block 288 and microprocessor 100 checks an internal register which indicates whether it is servicing an input or output device. An input device comprises static devices such as switches which are monitored to determine their condition. Output devices comprise dynamic devices such as solenoids and servoes which are provided with an output signal from the control unit, causing them to respond in a specified manner.

If it is determined in block 288 that the controlled device is an input device, the SAM 24 passes to block 290 wherein microprocessor 100 accesses the appropriate register which contains the current status of the input switch. From block 290, the SAM 24 next passes to block 292 and transmits the current input status via bus 22 to control unit 20. From block 292, the SAM 24 next passes to block 294, from whence the SAM 24 returns to the operation being performed prior to the initiation of the interrupt.

If it is determined in block 288 that the SAM 24 is connected to an output device, the SAM 24 passes to block 296 wherein microprocessor 100 accesses SAM output control port 114 and communicates an output command received from the control unit 20 via bus 22 through that control port 114. This action causes the output device connected through the receptacle to the SAM 24 output control port 114 to function in accordance with the output command. From block 296, the SAM 24 passes to block 292 and functions in the manner described previously.

In block 286, if it is determined that the command address does not match the address of the particular SAM 24, the SAM 24 passes to block 298 wherein it performs output diagnostcs to identify any errors which may be present. The output diagnostics accomplished in block 298 are more fully described hereafter with reference to FIG. 16.

From block 298, the SAM 24 passes to block 300 and microprocessor 100 accesses an appropriate register to determine whether a flag has been set during system operation requesting priority access to the control unit 20. If no priority request flag is detected, the SAM 24 passes to block 294, and resumes operation as it was doing prior to initialization of the interrupt processing. If a priority request is pending, the SAM 24 passes to block 302 wherein microprocessor 100 accesses another register which indicates whether the circuit in bus 22 through the priority request interface 106 is in use by some other SAM 24 in the system. If the priority request line is not free, the SAM 24 passes to block 294 and resumes the operation it was doing prior to initiation of interrupt processing.

It is noted that, because of the operating speed of the system, and because the priority request is interfacing with the user in a real-time sense, it is not necessary for the SAM 24 to wait in block 302 for a free line to become available so that the priority request can be communicated. During its normal operation, if the fault continues to exist the SAM 24 will pass through this interrupt processing routine again in less than a millisecond after entering block 294 and resuming its prior operating condition. Thus, if the priority request was not initially free, it may be on the next pass of the SAM 24 through the interrupt processing routine.

If it is found that a priority request line is available in block 302, the SAM 24 passes to block 304 wherein the SAM 24 may assert its priority request based upon its priority with respect to other SAMS in the system. More specifically, to avoid multiple SAMS attempting to access the priority request lines at the same time, access for a given SAM is based upon a priority relating to the address assigned to that SAM. For example, in one preferred embodiment, this priority is accomplished by multiplying the value of the address assigned to the particular SAM 24 by 2, and using the product of this multiplication as an initial value on a timing device such as a down counter. Once the timing device has counted down the required amount, the microprocessor 100 again checks the appropriate register to see whether the priority request line is free. If the line is free, the microprocessor 100 transmits a priority request across the priority request line of bus 22 via the priority request interface 106 to the control unit 20. Upon receiving this priority request, control unit 20 will suspend other operations and respond to the priority request signal. After obtaining priority, the microprocessor 100 transmits appropriate data identifying the error condition to the control unit via data lines in the bus 22 through serial I/O interface 102 and serial I/O interface 86.

After completing communications with the control unit 20, or after determining that the priority request line is not free, the SAM 24 passes from block 304 to block 294 and resumes normal operation.

The output diagnostic procedure accomplished in block 298 of FIG. 15 functions to determine whether an error exists in an output device connected to the particular SAM 24. This procedure can best be described by reference to FIG. 16 wherein it is shown that upon passing to block 298 of FIG. 15, the SAM 24 enters block 310 of FIG. 16 which initializes the output diagnostic procedure. From block 310, the SAM 24 passes to block 312 wherein microprocessor 100 references a register in the microprocessor 100 having a flag indicating whether the output device is under service. The presence of this flag indicates that an error in the device was previously detected.

If the output device is under service, the SAM 24 passes from block 312 to block 314 and compares the output command received from the control unit 20 with the current status of the output device. If the output command corresponds to the output status, the SAM 24 passes to block 316 and the microprocessor 100 updates the output fault register by resetting that register to indicate that no fault presently exists. The SAM 24 next passes to block 318 where the microprocessor 100 accesses the appropriate register and clears the output under service flag. From block 318, the SAM 24 passes to block 320 from whence it returns to block 298 of FIG. 15 for continued operation of the interrupt processing routine.

If the output command does not correspond to the output status, the SAM 24 passes from block 314 to block 322 wherein the microprocessor 100 decrements a value stored in an output fault register in the microprocessor 100. This output fault register serves as a time delay to debounce the error signal which has been detected. Thus, on successive passes through the output diagnostics routine, if the output command continues to not equal the output status, the output fault register continues to be decremented until the output fault register is exhausted, at which time it is determined that the output error is not a function of switching delays.

From block 322, the SAM 24 passes to block 324 and the microprocessor 100 determines whether the output fault register has been decremented to the point of exhaustion. If this is not the case, the SAM 24 passes to block 320 and continues operation as described above. If the fault register is exhausted, the SAM 24 passes from block 324 to block 326 wherein the microprocessor 100 accesses an internal register and sets an error flag, as well as providing data indicating the type of error which has been detected. From block 326, the SAM 24 passes to block 320 and continues operation as described above.

If the output under service flag is not found to be on in block 312, the SAM 24 passes to block 328 where the microprocessor 100 determines whether the output command corresponds to the output status of the output device. If they do not correspond, the SAM 24 passes to block 330 wherein microprocessor 100 accesses the appropriate register and sets the flag indicating that the output device is under service. From block 330, the SAM 24 then passes to block 320 and functions as described previously.

If the output command corresponds to the output status in block 328, then the SAM 24 passes to block 320, indicating that no output error has been detected. In block 320, the system functions as has been described previously.

In accomplishing the overall functioning of the system, the serial control signals define commands and responses In one preferred embodiment, the signals are configured in 8-bit words with the first two bits being the command and the remaining six bits being the address of the desired SAM 24. The particular bit arrangements utilized in the SAM/serial control unit command and response procedures in one preferred embodiment are as follows:

For a command from the control unit 20 to a SAM 24, the SAM address is contained in bits 5-0, while bits 7 and 6 contain the command. The commands are as follows:

| BIT 7, 6 | COMMAND |
| --- | --- |
| 00 | Normal Input |
| 01 | Spare |
| 10 | Output Off |
| 11 | Output On |

For a SAM 24 response to the output command, bits 5-0 contain the address of the responding SAM, while bits 7 and 6 contain output responses as follows:

| BIT 7, 6 | RESPONSE |
| --- | --- |
| 00 | Output Normal |
| 01 | Spare |
| 10 | Solenoid Open Failure Probable |
| 11 | Solid State Relay Failure Probable |

For a SAM 24 response to an input command, bits 5-0 define the address of the responding AM with bits 7 and 6 containing the input response as follows:

| BIT 7, 6 | RESPONSE |
| --- | --- |
| 00 | Switch Closed |
| 01 | Switch Open |
| 10 | Partial Switch Failure-Closed |
| 11 | Partial Switch Failure-Open |

Reserved address zero commands from the control unit 20 to the SAM 24 are accomplished by using an address having all zeros in bits 5-0, requesting special processing. Bits 6 and 7 identify the command to be performed. They are as follows:

| BIT 7, 6 | COMMAND |
| --- | --- |
| 00 | Priority Acknowledge |
| 01 | Software SAM Reset |
| 10 | Enter SAM Diagnostics |
| 11 | Spare |

Attached hereto as Appendix A is a copy of a preferred embodiment of object code utilized by each SAM 24. The object code is written in 6801 assembler language. Attached as Appendix B is a copy of a preferred embodiment of object code comprising an I/O handler utilized by the control unit 20 for communicating with the SAMS 24 and users. This object code is written in the 68000 assembler language. Also attached, as Appendix C, is a copy of a preferred embodiment of object code comprising the ladder logic editor utilized by the control unit 20. This object code is also written in the 68000 assembler language. In addition, attached as Appendix D, is a copy of a preferred embodiment of object code comprising the screen building editor utilized by the control unit 20. This object code is also written in 68000 assembler language. Of course, it will be appreciated that the code provided in these appendices could be "programmed" in numerous different configurations and in substantially any of the numerous languages which are well-known in the technology. The embodiments disclosed in the attached appendices are, therefore, provided as an example of one preferred embodiment of the invention and should not be construed to limit the scope of the invention in any way.

The apparatus and method described above comprise hardware and software defining a process control system which is very versatile in its application for controlling many different processes, and which is readily expandable so that additional process components may be monitored and/or controlled by merely adding additional SAMS 24 onto the existing control system, and interconnecting the SAMS to the equipment to be controlled in the manner described above. The individual SAMS 24 each contain intelligence which permits them not only to monitor and control the associated process component, but to identify both soft and hard errors, and to access the control unit 20 on a priority basis to notify the user of the existence of the error, and to enable the user to readily identify the location of the error, the type of error, and to take corrective actions in order to remove the error condition.

In summary, not only does the invention described herein comprise a significant improvement over the prior art in monitoring and controlling processes, but it also overcomes other long existent problems in the technology by (1) providing a means for rapidly expanding or modifying the system configuration and operation in order to accommodate different processes, or changes in existing processes; (2) providing a readily changeable visual display to accommodate system expansions or modifications and to permit ease in user interaction in the control of variables in the process; (3) providing intelligent local control modules which, independently from a central controller, monitor and store status information of a discrete controlled process element; (4) providing a means for identifying local failures and potential problems, and for accessing the central unit on a priority basis to alert the user regarding these matters; (5) providing a means for accessing the central control unit on a priority request basis, where the priority between different modules accessing the same control unit is predetermined to avoid conflicts between the modules and is readily changeable by adjustment to individual modules; (6) providing an uncomplicated system having the local control modules configured in a series orientation on a single control bus; and (7) providing a process control system which is compact and lightweight so that the central controller is portable and may be readily moved to facilitate control of different processes.

In addition to overcoming these problems, the device and method of the present invention comprise a process control system which has greatly improved reliability over the prior art, and simplicity in construction due to the serial configuration of the system. Further, this compact system is economical to produce, and provides high manpower efficiency due to the centralized arrangement of all control and monitoring equipment.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A process control system for monitoring and controlling elements of a physical process in real time, said system comprising:
    a plurality of modules for monitoring elements of a process;
    means in selected ones of said modules for controlling functions of corresponding selected elements of the process;
    means for electrically connecting the modules in a series configuration;
    means for addressing a selected module by providing a serial sequence of signals to each of said modules, wherein said sequence of signals identifies said selected module;
    means in said modules for providing an electrical signal indicating status of the monitored element;
    means responsive to said sequence of signals for communicating said status to users;
    means in said modules responsive to the status of the monitored element for detecting selected status conditions of the monitored element;
    means in said modules responsive to the means for detecting selected status conditions for transmitting signals identifying said selected status conditions and identifying a particular module which detected the selected status conditions directly to said means for addressing a selected module, independent of said sequence of signals; and
    means in said addressing means and responsive to the signals identifying said selected status conditions for transmitting signals to a selected module in priority over all other actions of said addressing means, in order to control a function of a process element associated with said selected module and thereby effect a desired change in said function of said process element.

2. A process control system as defined in claim 1 wherein said modules comprise control modules and said means for electrically connecting the modules comprise electrical connectors affixed at selected locations along a conductive element for releasably receiving and securing said control modules in electrical contact with said conductive element.

3. A process control system as defined in claim 1 wherein the means for addressing a selected sensor comprises a control unit which defines an interface for communicating commands and information between the modules and a user.

4. A process control system as defined in claim 3 wherein the control unit includes means for indicating a location in the controlled process where the selected status condition is being detected.

5. A process control system as defined in claim 3 wherein the control unit provides information to users comprising proposed procedures for responding to the detected, selected status conditions.

6. A process control system as defined in claim 3 wherein the control unit includes a touch sensitive video screen for visually communicating information to a user, and for receiving instructions from a user via an object placed in proximity to a selected location on the screen.

7. A process control system as defined in claim 6 wherein content of the communicated information and organization of visual control locations on the screen are provided through user interaction with the control unit.

8. A process control system as defined in claim 3 wherein the means for communicating selected status conditions comprises means for accessing the control unit on a priority basis so that after being so accessed, and before receiving further data signals from other modules, the control unit receives the signals from said particular module identifying the selected status conditions.

9. A process control system as defined in claim 8 further comprising means in said modules for establishing priority between modules in obtaining priority access to the control unit when more than one modules has detected such selected status conditions.

10. A process control system as defined in claim 1 wherein the modules comprise control modules which include means for monitoring status of process elements independently of externally produced control signals.

11. A process control system as defined in claim 1 wherein the selected status conditions comprise conditions which hinder desired process operation.

12. A process control system for monitoring and controlling elements of a physical process in real time, said system comprising:
    an electrical conductor;
    a plurality of local control modules electrically connected to each other in series configuration through the electrical conductor;
    a control unit electrically connected through the electrical conductor to the series configuration of the local control modules;
    means for electrically connecting the local control modules to selected elements of the process;
    means in each local control module for determining operating status of process elements to which the module is electrically connected;
    means in each local control module and responsive to said determining means for identifying selected status conditions;
    means responsive to the identifying means for accessing the control unit to enable communication of the identified selected status conditions directly from a local control module to said control unit, with said communication of the selected status conditions having priority over other types of communications between the control unit and other local control modules; and
    means in the control unit and responsive to receipt of said selected status conditions for transmitting signals to a selected local control module in priority over all other actions of the control unit in order to control a function of a process element to which the selected local control module is connected, and thereby effect a desired change in said function of said process element.

13. A process control system as defined in claim 12 wherein the local control modules are releasably connected to the electrical conductor by electrical connectors affixed at selected locations along the electrical conductor for releasably receiving and securing said control modules in electrical contact with said conductive element.

14. A process control system as defined in claim 12 wherein the electrical conductor comprises at least one conductive element in a multi-conductor bus.

15. A process control system as defined in claim 12 wherein the selected status conditions comprise conditions which hinder desired process operation.

16. A process control system as defined in claim 12 wherein the control unit includes a touch sensitive video screen for visually communicating information to a user, and for receiving instructions from a user via an object placed in proximity to a selected location on the screen.

17. A process control system as defined in claim 16 wherein content of the communicated information and organization of visual control locations on the screen are provided through user interaction with the control unit.

18. A process control system for monitoring and controlling elements of a physical process in real time, said system comprising:
a central control unit;
a serial data bus electrically connected to the central control unit and having a plurality of electrical conductors extending within said bu;
a plurality of control modules;
means for removably securing said control modules in electrical contact with at least one of said electrical conductors so that said control modules are electrically connected to said control unit;
means for removably securing said control modules in electrical contact with selected elements of the process;
means in said modules for monitoring operating status of process elements to which the modules are electrically connected;
means in said modules responsive to the monitoring means for identifying selected status conditions of the monitored process elements;
means in said modules responsive to the identifying means for obtaining priority communications access to the control unit;
means for communicating said selected status conditions from a control module directly to the control unit by means of said priority communications access; and
means in said control unit and responsive to said selected status conditions for transmitting signals to a selected control module in priority over all other communications between the control unit and any control module, in order to control operation of a process element electrically connected to the selected control module, thereby effecting a desired change in said function of said process element.

19. A process control system as defined in claim 18 further comprising means in said modules for establishing priority between modules in obtaining priority access to the control unit when more than one module has detected such selected status conditions.

20. A process control system as defined in claim 19 wherein the means for establishing priority between modules comprises a counting circuit which delays production of a signal to the central unit requesting priority access for a time period relating to an address assigned to the module.

21. A process control system as defined in claim 18 wherein the means for removably securing said control modules in electrical contact with elements of the process comprises a limit switch receptacle.

22. A process control system as defined in claim 18 wherein the means for removably securing said control modules in electrical contact with elements of the process comprises a solenoid connector.

23. A process control system as defined in claim 18 wherein the central control unit defines an interface for communicating commands and information between the control modules and a user.

24. A process control system as defined in claim 23 wherein the control modules further comprise means responsive to command signals from the user via the control unit for operating process elements electrically connected to the control modules in accordance with said command signals.

25. A process control system for monitoring and controlling elements o a physical process in real time, the system comprising:
a central control unit;
a serial data bus electrically connected to the central control unit and having a plurality of electrical conductors extending within said bus; and
a plurality of control modules which are each removably secured in electrical connection with electrical conductors in said serial data bus in a series configuration, and which are each removably secured to an element of the process, wherein first selected ones of said control modules each monitor at least one process element and communicate, on a priority basis directly to the control unit, data identifying existence of selected status conditions of said at least one process element, and wherein second selected ones of said control modules each control operation of at least one selected process element in response to command signals from the control unit and receive, on a priority basis, control signals transmitted directly from the control unit in response to said data identifying selected status conditions, which signals effect desired changes in operation of said at least one selected process element.

26. A process control system for monitoring and controlling elements of a physical process in real time, the system comprising:
a central control unit;
at least one remote module electrically connected to the central control unit and to an element of the process for communicating information relating to operation of the element of the process on a priority basis and independent of operator intervention directly to and from the central control unit; and
a video device electrically connected to the control unit for visually presenting information received from said remote module, said video device responsive to user input for producing signals causing communication of control instructions from the control unit to the remote module, and said video device responsive to user input to present selected information visually in a format and configuration specified by the user.

27. A process control system as defined in claim 26 wherein the video device includes a touch sensitive screen for visually communicating information to a user, and for receiving instructions from a user via an object placed in proximity to a selected location on the screen.

28. A process control system as defined in claim 27 wherein content of the communicated information and organization of visual control locations on the screen are provided through user interaction with the control unit.

29. In a process control system having a plurality of control modules electrically connected in a series configuration to a control unit, and with said control modules electrically connected to elements of a physical process to be controlled in real time, a method of controlling the process comprising the steps of:
    addressing selected control modules from the control unit by providing a serial sequence of signals to each of said control modules, wherein the sequence of signals identifies a selected control module;
    providing an electrical signal in the selected control module indicating status of a monitored process element;
    in response to the sequence of signals, communicating said status to the control unit;
    in the control modules, detecting selected status conditions of the monitored element;
    in response to detection of selected status conditions, communicating a signal identifying said selected status conditions directly from a plurality control module which detected said selected status conditions to the control unit independent of said sequence of signals; and
    in response to receipt of the selected status conditions, communicating a signal directly from the control unit to a selected control module on a priority basis over other signals, in order to control a function of the monitored process element and to thereby effect a desired change in the function of the process element.

30. A method of controlling a process as defined in claim 29 herein the step of communicating a signal identifying said selected status conditions comprises the step of transmitting a priority request signal from said particular control module to the control unit to access the control unit on a priority basis so that after being so accessed, and before receiving further data signals from other control modules, the control unit receives the signals from said particular control module, identifying the selected status conditions.

31. A method of controlling a process as defined in claim 30 further comprising the step of establishing priority between control modules in obtaining priority access to the control unit by:
    assigning a selected address value to a selected control module; and
    delaying transmission of the priority request signal from the selected control module for a time period relating to the address value assigned to said selected control module.

32. A method of controlling a process as defined in claim 29 wherein, prior to the step of addressing selected control modules, the method comprises the step of assigning selected address values to each control module such that the control module may be selectively accessed to monitor or control a process element by providing to the control module a serial sequence of signals corresponding to the assigned address value of that control module.

33. A method of controlling a process as defined in claim 29 wherein the control unit is electrically connected to a touch sensitive video screen which comprises an interface for visually presenting information from the control modules to a user and for receiving input signals from the user via the touch screen for control of the control modules and of process elements and wherein, prior to the step of addressing selected control modules, the method comprises the steps of:
    removably securing additional control modules in electrical connection and in series configuration with the other control modules;
    removably securing said additional control modules in electrical connection with process elements to monitor and control said process elements;
    assigning an address to each additional module; and
    modifying the information on the touch screen to include addresses of the additional modules and to configure the information on the screen as desired.

34. A method of controlling a process as defined in claim 29, further comprising the step of providing, via the control unit to the user, diagnostic information relating to the selected status condition which was detected.

* * * * *